(12) United States Patent
Oketani

(10) Patent No.: US 11,677,599 B2
(45) Date of Patent: Jun. 13, 2023

(54) COMMUNICATION APPARATUSES, METHODS, SYSTEM, PROGRAMS AND RECORDING MEDIA

(71) Applicant: NEC CORPORATION, Tokyo (JP)

(72) Inventor: Kengo Oketani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/320,024

(22) PCT Filed: Jul. 11, 2017

(86) PCT No.: PCT/JP2017/025201
§ 371 (c)(1),
(2) Date: Jan. 23, 2019

(87) PCT Pub. No.: WO2018/021008
PCT Pub. Date: Feb. 1, 2018

(65) Prior Publication Data
US 2019/0268198 A1    Aug. 29, 2019

(30) Foreign Application Priority Data
Jul. 29, 2016    (JP) ............... JP2016-1497866

(51) Int. Cl.
*H04W 4/00*    (2018.01)
*H04L 27/26*   (2006.01)
(Continued)

(52) U.S. Cl.
CPC ........ *H04L 27/2607* (2013.01); *H04L 5/0094* (2013.01); *H04L 27/26* (2013.01);
(Continued)

(58) Field of Classification Search
CPC ..... H04W 72/04; H04W 88/08; H04W 76/00; H04W 72/042; H04W 72/0446; H04L 27/2607; H04L 5/0094; H04L 27/26
See application file for complete search history.

(56) References Cited

U.S. PATENT DOCUMENTS

2007/0297323 A1    12/2007    Seki et al.
2010/0027482 A1    2/2010     Murakami et al.
(Continued)

FOREIGN PATENT DOCUMENTS

JP    2007-300192 A    11/2007
JP    2015-185961 A    10/2015
(Continued)

OTHER PUBLICATIONS

3GPP TSG RAN WG1 Meeting #85, Mixed Numerology in an OFDM System, May 23-27, 2016, R1-165833 (Year: 2016).*
(Continued)

*Primary Examiner* — Siren Wei
(74) *Attorney, Agent, or Firm* — Sughrue Mion, PLLC

(57) ABSTRACT

In order to allow for accommodating different services having different demands while suppressing interference, a first apparatus of the present invention includes: an information obtaining unit configured to obtain guard band information which indicates a guard band within a frequency band including a first band with a first subcarrier spacing and a second band with a second subcarrier spacing; and a communication processing unit configured to transmit the guard band information to a terminal apparatus.

19 Claims, 23 Drawing Sheets

(51) Int. Cl.
  *H04L 5/00* (2006.01)
  *H04W 72/0446* (2023.01)
  *H04W 72/04* (2023.01)
  *H04W 72/23* (2023.01)

(52) U.S. Cl.
  CPC ....... *H04W 72/04* (2013.01); *H04W 72/0446* (2013.01); *H04W 72/23* (2023.01)

(56) References Cited

U.S. PATENT DOCUMENTS

| | | | |
|---|---|---|---|
| 2010/0080308 A1* | 4/2010 | Yin | H04L 5/0007 370/210 |
| 2013/0029670 A1* | 1/2013 | Lee | H04W 36/08 455/444 |
| 2014/0293968 A1* | 10/2014 | Ebrahimi Tazeh Mahalleh | H04W 56/002 370/336 |
| 2015/0011233 A1* | 1/2015 | Kazmi | H04W 72/044 455/454 |
| 2017/0079026 A1 | 3/2017 | Li et al. | |
| 2017/0164350 A1* | 6/2017 | Sun | H04W 76/27 |
| 2018/0019859 A1* | 1/2018 | Cheng | H04B 7/0626 |

FOREIGN PATENT DOCUMENTS

| | | |
|---|---|---|
| JP | 2017-520148 A | 7/2017 |
| WO | 2006/092852 A1 | 9/2006 |
| WO | 2015163481 A1 | 10/2015 |
| WO | 2015169156 A1 | 11/2015 |

OTHER PUBLICATIONS

Notice of Reasons for Refusal dated Mar. 17, 2020 from the Japanese Patent Office in application No. 2018-529489.
Guangdong OPPO Mobile Telecom, "Frame structure supporting flexible parameter allocations", 3GPP TSG-RAN WG1 #85, R1-164472, China, May 23-27, 2016, pp. 2-3/E (2 pages).
Ericsson, "Mixed Numerology in an OFDM system", 3GPP TSG-RAN WG1 #85, R1-165833, Nanjing, China, May 23-27, 2016, pp. 1-9.
International Search Report for PCT/JP2017/025201 dated Oct. 10, 2017 [PCT/ISA/210].
Written Opinion of the International Searching Authority, dated Oct. 10, 2017 from the International Bureau in counterpart International application No. PCT/JP2017/025201.
Communication dated Oct. 27, 2020 by the Japanese Patent Office in Application No. 2018-529489.
JP Office Action for JP Application No. 2021-102460, dated May 24, 2022 with English Translation.

* cited by examiner ations No. PCT/JP2017/025201, filed on Jul. 11, 2017, which claims priority from Japanese Patent Application No. 2016-149786, filed on Jul. 29, 2016.

COMMUNICATION APPARATUSES, METHODS, SYSTEM, PROGRAMS AND RECORDING MEDIA

CROSS REFERENCE TO RELATED APPLICATIONS

This application is a National Stage of International Application No. PCT/JP2017/025201, filed on Jul. 11, 2017, which claims priority from Japanese Patent Application No. 2016-149786, filed on Jul. 29, 2016.

BACKGROUND

Technical Field

The present invention relates to communication apparatuses, methods, a system, programs and recording media.

Background Art

In recent years, explosive dissemination of high-end terminals such as smart phones and tablets placed a demand for considerably enlarging a network capacity on mobile networks. In order to satisfy the demand, Orthogonal Frequency-Division Multiplexing (OFDM) was adopted, in the specifications named Long Term Evolution (LTE) and LTE-Advanced, for downlink transmissions as a communication scheme that enhances frequency utilization efficiency. According to these specifications, the OFDM subcarrier spacing is uniquely specified to be 15 kHz and the OFDM symbol duration is specified to be 66.7 µs that is the inverse of the subcarrier spacing (=1/15 kHz). The subcarrier spacing is a key parameter of OFDM.

In OFDM, collapse of orthogonality between subcarriers may cause interference. In order to suppress such interference, for example, guard bands are arranged between bands.

For example, Patent Literature 1 (PTL1) discloses a technology to arrange a guard band region at a boundary between bands, determines whether to use the guard band region for data transmission or to use it as a guard band and notify mobile stations of it. For example, PTL2 discloses a technology to arrange a guard band with a narrow width (or no guard band arranged) for a high Signal-to-Noise (S/N) ratio subchannel while arranging a guard band with a wide width for a low S/N ratio subchannels.

CITATION LIST

Patent Literature

[PTL 1] WO 2006/092852
[PTL 2] JP 2007-300192 A

SUMMARY

Technical Problem

Discussions on next-generation specification called fifth generation (5G) specification that succeeds LTE and LTE-Advanced already started. In the discussions, a new demand to realize, in a single radio access scheme, not only the above-mentioned mobile broadband but also Internet of Thing (IoT) that involves numerous devices to be connected and mission-critical services that require lower latency has been raised. One of possible approaches to satisfy such a demand is to adjust OFDM-related parameters. For example, the subcarrier spacing can be adjusted in some way, but it would then be important to suppress interference between subcarriers.

An example object of the present invention is to allow for accommodating different services having different demands while suppressing interference.

Solution to Problem

An apparatus according to a first aspect of the present invention includes an information obtaining unit configured to obtain guard band information which indicates a guard band within a frequency band including a first band with a first subcarrier spacing and a second band with a second subcarrier spacing; and a communication processing unit configured to transmit the guard band information to a terminal apparatus.

An apparatus according to a second aspect of the present invention includes a communication processing unit configured to receive guard band information from a base station, the guard band information indicating a guard band within a frequency band including a first band with a first subcarrier spacing and a second band with a second subcarrier spacing. The communication processing unit is configured to perform radio communications within the frequency band on the basis of the guard band information.

An apparatus according to a third aspect of the present invention includes a communication processing unit configured to use one or more subcarriers as a guard band to perform radio communications within a frequency band, the one or more subcarriers being within the frequency band which includes a first band with a first subcarrier spacing and a second band with a second subcarrier spacing.

A method according to the first aspect of the present invention includes obtaining guard band information which indicates a guard band within a frequency band including a first band with a first subcarrier spacing and a second band with a second subcarrier spacing; and transmitting the guard band information to a terminal apparatus.

A method according to the second aspect of the present invention includes receiving guard band information from a base station, the guard band information indicating a guard band within a frequency band including a first band with a first subcarrier spacing and a second band with a second subcarrier spacing; and performing radio communications within the frequency band on the basis of the guard band information.

A method according to the third aspect of the present invention includes using one or more subcarriers as a guard band to perform radio communications within a frequency band, the one or more subcarriers being within the frequency band which includes a first band with a first subcarrier spacing and a second band with a second subcarrier spacing.

A system according to an aspect of the present invention includes a base station and a terminal apparatus. The base station is configured to transmit guard band information to the terminal apparatus, the guard band information indicating a guard band within a frequency band including a first band with a first subcarrier spacing and a second band with a second subcarrier spacing. The terminal apparatus is configured to perform radio communications within the frequency band on the basis of the guard band information.

A program according to the first aspect of the present invention is a program for causing a processor to execute: obtaining guard band information which indicates a guard band within a frequency band including a first band with a first subcarrier spacing and a second band with a second subcarrier spacing; and transmitting the guard band information to a terminal apparatus.

A program according to the second aspect of the present invention is a program for causing a processor to execute: receiving guard band information from a base station, the guard band information indicating a guard band within a frequency band including a first band with a first subcarrier spacing and a second band with a second subcarrier spacing; and performing radio communications within the frequency band on the basis of the guard band information.

A program according to the third aspect of the present invention is a program for causing a processor to execute: using one or more subcarriers as a guard band to perform radio communications within a frequency band, the one or more subcarriers being within the frequency band which includes a first band with a first subcarrier spacing and a second band with a second subcarrier spacing.

A recording medium according to the first aspect of the present invention is a computer-readable non-transitory recording medium having recorded thereon a program for causing a processor to execute: obtaining guard band information which indicates a guard band within a frequency band including a first band with a first subcarrier spacing and a second band with a second subcarrier spacing; and transmitting the guard band information to a terminal apparatus.

A recording medium according to the second aspect of the present invention is a computer-readable non-transitory recording medium having recorded thereon a program for causing a processor to execute: receiving guard band information from a base station, the guard band information indicating a guard band within a frequency band including a first band with a first subcarrier spacing and a second band with a second subcarrier spacing; and performing radio communications within the frequency band on the basis of the guard band information.

A recording medium according to the third aspect of the present invention is a computer-readable non-transitory recording medium having recorded thereon a program for causing a processor to execute: using one or more subcarriers as a guard band to perform radio communications within a frequency band, the one or more subcarriers being within the frequency band which includes a first band with a first subcarrier spacing and a second band with a second subcarrier spacing.

Advantageous Effects of Invention

According to the present invention, it will be possible to accommodate different services having different demands while suppressing interference. Note that the present invention may exert other advantageous effects instead of the above advantageous effects or together with the above advantageous effects.

DESCRIPTION OF THE EXAMPLE EMBODIMENTS

Example embodiments of the present invention will be described in detail below with reference to the accompanying drawings. Note that, in the present description and drawings, elements to which the same or similar descriptions are applicable are denoted by the same reference signs, whereby overlapping descriptions may be omitted.

Descriptions will be given in the following order.
1. Overview of Example Embodiments of Present Invention
2. First Example Embodiment
2.1. Configuration of System
2.2. Configuration of Base Station
2.3. Configuration of Terminal Apparatus
2.4. Technical Features
2.5. Example Alterations
3. Second Example Embodiment
3.1. Configuration of System
3.2. Configuration of Base Station
3.3. Configuration of Terminal Apparatus
3.4. Technical Features
3.5. Example Alterations
4. Third Example Embodiment
4.1. Configuration of System
4.2. Configuration of Base Station
4.3. Configuration of Terminal Apparatus
4.4. Technical Features

1. Overview of Example Embodiments of Present Invention

First, an overview of example embodiments of the present invention will be described.

(1) Technical Issues

Discussions on next-generation specification called fifth generation (5G) specifications that succeed LTE and LTE-Advanced already started. In the discussions, a new demand to realize, in a single radio access scheme, not only the above-mentioned mobile broadband but also Internet of Thing (IoT) that involves numerous devices to be connected and mission-critical services that require lower latency has been raised. One of possible approaches to satisfy such a demand is to adjust OFDM-related parameters. For example, the subcarrier spacing can be adjusted in some way, but it is then important to suppress interference between subcarriers.

Therefore, it is desirable to allow for accommodating different services having different demands while suppressing interference.

(2) Technical Features

According to example embodiments of the present invention, for example, a base station transmits, to a terminal apparatus, guard band information which indicates a guard band within a frequency band in which different subcarrier spacings exist. Then, the terminal apparatus performs radio communications within the frequency band on the basis of the guard band information.

That allows, for example, for accommodating different services having different demands while suppressing interference.

Note that the above-described technical features are concrete examples of example embodiments of the present invention, and the example embodiments of the present invention are, of course, not limited to the above-described technical features.

2. First Example Embodiment

Next, a first example embodiment of the present invention will be described with reference to FIG. 1 to FIG. 13.

<2.1. Configuration of System>

Figure 1:
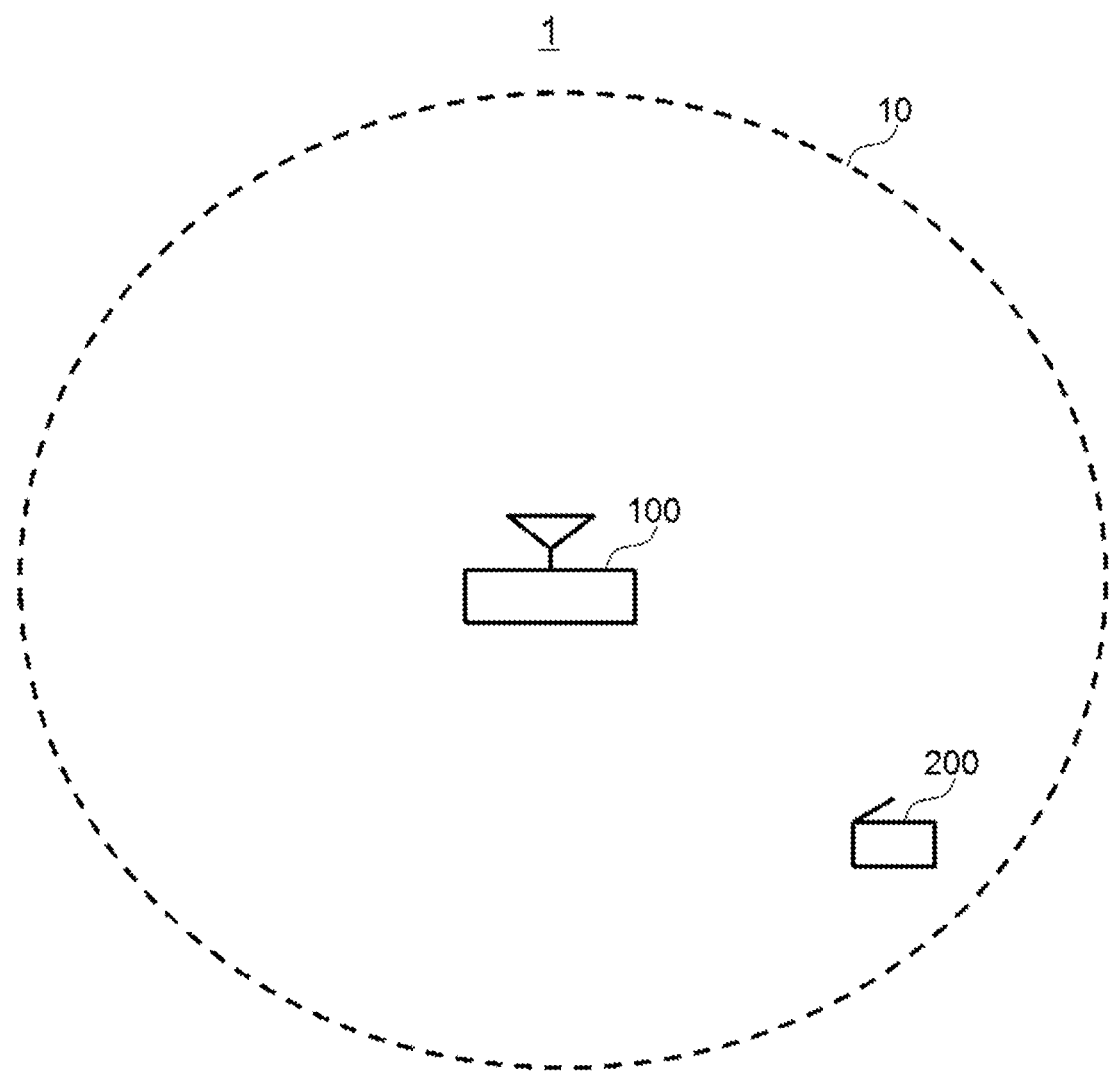
FIG. 1 is an explanatory diagram illustrating an example of a schematic configuration of a system of a first example embodiment.

An example of a configuration of a system 1 of the first example embodiment is described with reference to FIG. 1. FIG. 1 is an explanatory diagram illustrating an example of a schematic configuration of the system 1 of the first example embodiment. Referring to FIG. 1, the system 1 includes a base station 100 and a terminal apparatus 200.

For example, the system 1 may be a system that complies with Third Generation Partnership Project (3GPP) standards. More specifically, for example, the system 1 may be a system that complies with specifications of LTE, LTE-Advanced and/or 5G.

The system 1 may be Frequency Division Duplex (FDD) system or Time Division Duplex (TDD) system.

(1) Base Station 100

The base station 100 is configured to perform radio communications with terminal apparatuses (for example, the terminal apparatus 200) located within a cell 10 (or coverage area 10). For example, the base station 100 is configured to transmit signals to a terminal apparatus in downlink and receive signals from a terminal apparatus in uplink.

For example, the base station 100 uses OFDM as a radio access scheme. Alternatively, the base station 100 may use another radio access scheme (e.g. Filtered OFDM, Universal Filtered Multi Carrier (UFMC), Generalized Frequency Division Multiplex (GFDM) or the like). Such a radio access scheme may be a scheme for downlink or a scheme for uplink. The schemes for downlink and uplink may be different schemes or the identical scheme.

The base station 100 is a node that performs radio communications with terminal apparatuses and, in other words, is a Radio Access Network (RAN) node. For example, the base station 100 may be a Node B, Home Node B (H-Node B), evolved Node B (eNodeB), or Home evolved Node B (H-eNodeB) or may be generation Node B (gNodeB) in 5G. The base station 100 may include a plurality of units (or plurality of nodes). The plurality of units (or plurality of nodes) may include a first unit (or first node) for performing processing of a lower protocol layer and a second unit (or second node) for performing processing of a higher protocol layer. As an example, the first unit may be referred to as Distributed Unit (DU) or Access Unit (AU) and the second unit may be referred to as Center/Central Unit (CU). As another example, the first unit may be referred to as Radio Unit (RU) or Remote Unit (RU) and the second unit may be referred to as Digital Unit (DU). The RU may be a Remote Radio Head (RRH) or a Remote Radio Unit (RRU) and the DU may be a Base Band Unit (BBU). Of course, the names of the first unit (first node) and the second unit (second node) are not limited to such examples. Alternatively, the base station 100 may be a single unit (or single node). In this case, the base station 100 may be one of the plurality of units (for example, one of the first and second units) and may be connected to another unit of the plurality of units (for example, the other one of the first and second units).

(2) Terminal Apparatus 200

The terminal apparatus 200 is configured to perform radio communications with a base station. For example, the terminal apparatus 200 performs radio communications with the base station 100 when it is located within the cell 10. For example, the terminal apparatus 200 is configured to receive signals from a base station in downlink and transmit signals to a base station in uplink.

<2.2. Configuration of Base Station>

Figure 2:
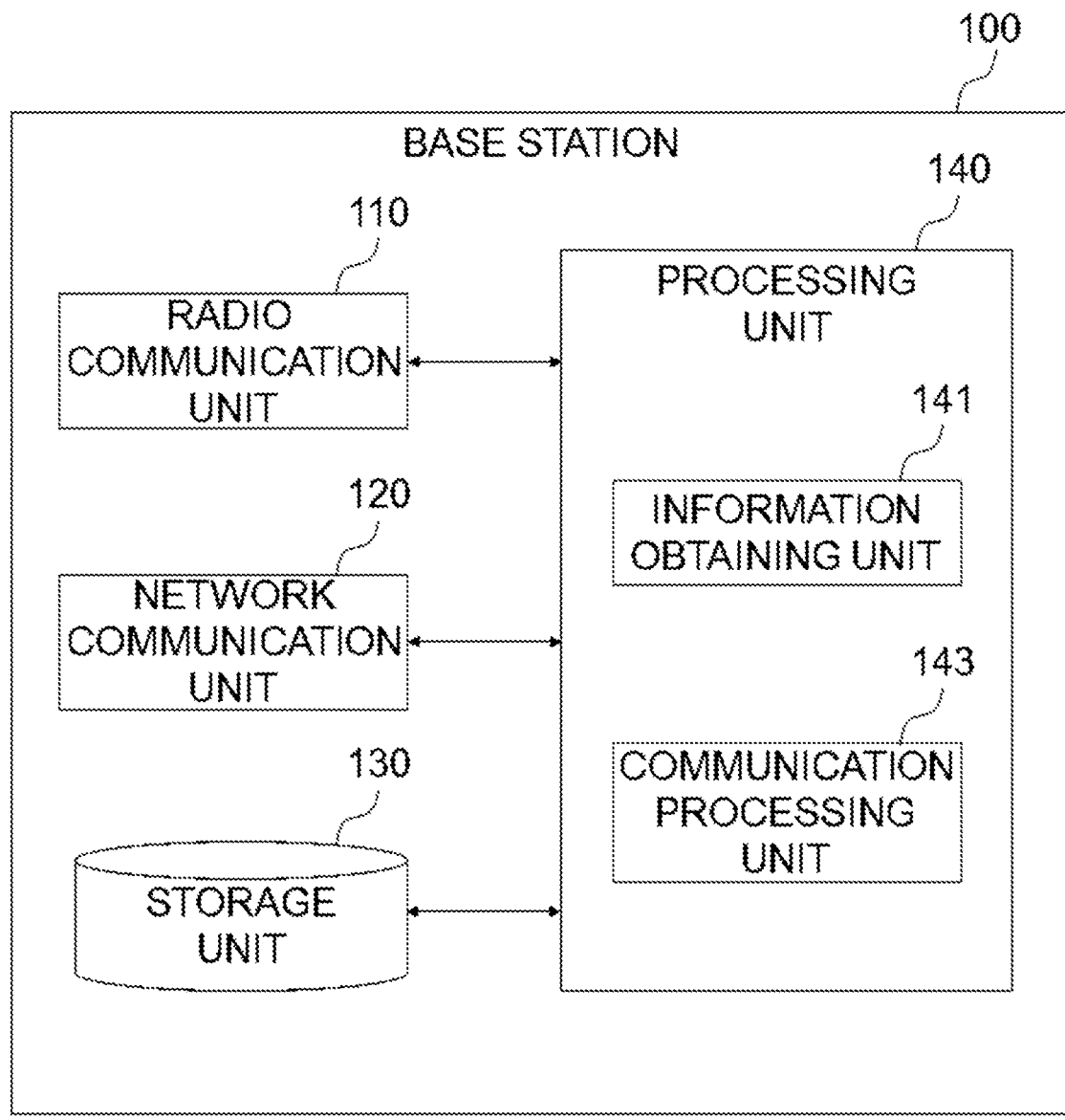
FIG. 2 is a block diagram illustrating an example of a schematic configuration of a base station of the first example embodiment.

Next, an example of a configuration of the base station 100 of the first example embodiment is described with reference to FIG. 2. FIG. 2 is a block diagram illustrating an example of a schematic configuration of the base station 100 of the first example embodiment. Referring to FIG. 2, the base station 100 includes a radio communication unit 110, a network communication unit 120, a storage unit 130 and a processing unit 140.

(1) Radio Communication Unit 110

The radio communication unit 110 is configured to wirelessly transmit and receive signals. For example, the radio communication unit 110 is configured to receive signals from a terminal apparatus and transmit signals to a terminal apparatus.

(2) Network Communication Unit 120

The network communication unit 120 is configured to receive signals from a backhaul and transmit signals to the backhaul.

(3) Storage Unit 130

The storage unit 130 is configured to store programs and parameters for operation of the base station 100 as well as various data temporarily or permanently.

(4) Processing Unit 140

The processing unit 140 is configured to provide various functions of the base station 100. The processing unit 140 includes an information obtaining unit 141 and a communication processing unit 143. Note that the processing unit 140 may further include another constituent element than these constituent elements. That is, the processing unit 140 may perform operations other than the operations of these constituent elements. Specific actions of the information obtaining unit 141 and the communication processing unit 143 will be described in detail later.

For example, the processing unit 140 (communication processing unit 143) communicates with terminal apparatuses (for example, the terminal apparatus 200) via the radio communication unit 110. For example, the processing unit 140 communicates with other network nodes via the network communication unit 120.

(5) Example Implementations

The radio communication unit 110 may be implemented with an antenna, a high frequency (Radio Frequency (RF)) circuit and the like. The network communication unit 120 may be implemented with a network adapter, a network interface card or the like. The storage unit 130 may be implemented with a memory (for example, non-volatile memory and/or volatile memory), hard disc and/or the like. The processing unit 140 may be implemented with a Base Band (BB) processor, another processor and/or the like. The information obtaining unit 141 and the communication processing unit 143 may be implemented with the same processor or with respective different processors. The above memory (storage unit 130) may be included in such a processor (a chip).

The base station 100 may include a memory that stores programs and one or more processors that are capable of executing the programs and the one or more processors may execute the operations of the processing unit 140 (the information obtaining unit 141 and the communication processing unit 143). The programs may be programs for causing the one or more processors to execute the operations of the processing unit 140 (the information obtaining unit 141 and the communication processing unit 143).

<2.3. Configuration of Terminal Apparatus>

Figure 3:
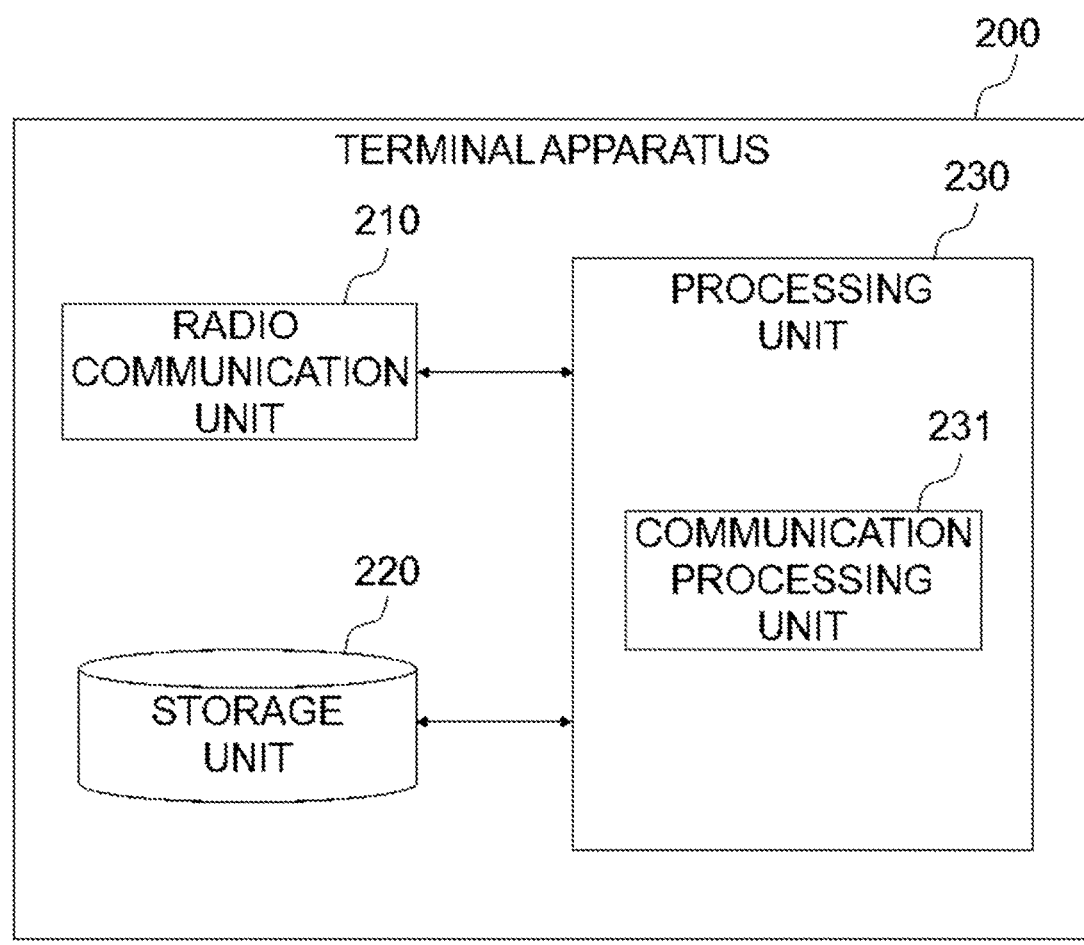
FIG. 3 is a block diagram illustrating an example of a schematic configuration of a terminal apparatus of the first example embodiment.

Next, an example of a configuration of the terminal apparatus 200 of the first example embodiment is described with reference to FIG. 3. FIG. 3 is a block diagram illustrating an example of a schematic configuration of the terminal apparatus 200 of the first example embodiment. Referring to FIG. 3, the terminal apparatus 200 includes a radio communication unit 210, a storage unit 220 and a processing unit 230.

(1) Radio Communication Unit 210

The radio communication unit 210 is configured to wirelessly transmit and receive signals. For example, the radio communication unit 210 is configured to receive signals from a base station and transmit signals to a base station.

(2) Storage Unit 220

The storage unit 220 is configured to store programs and parameters for operation of the terminal apparatus 200 as well as various data temporarily or permanently.

(3) Processing Unit 230

The processing unit 230 is configured to provide various functions of the terminal apparatus 200. The processing unit 230 includes a communication processing unit 231. Note that the processing unit 230 may further include another constituent element than the communication processing unit 231. That is, the processing unit 230 may perform operations other than the operations of the communication processing unit 231. Specific actions of the communication processing unit 231 will be described in detail later.

For example, the processing unit 230 (communication processing unit 231) communicates with a base station (for example, the base station 100) via the radio communication unit 210.

(4) Example Implementations

The radio communication unit 210 may be implemented with an antenna, a high frequency (RF) circuit and the like. The storage unit 220 may be implemented with a memory (for example, non-volatile memory and/or volatile memory), hard disc and/or the like. The processing unit 230 may be implemented with a Base Band (BB) processor, another processor and/or the like. The above memory (storage unit 220) may be included in such a processor (a chip).

The terminal apparatus 200 may include a memory that stores programs and one or more processors that are capable of executing the programs and the one or more processors may execute the operations of the processing unit 230 (communication processing unit 231). The programs may be programs for causing the one or more processors to execute the operations of the processing unit 230 (communication processing unit 231).

<2.4. Technical Features>

Next, with reference to FIG. 4 to FIG. 9, technical features of the first example embodiment are described.

The base station 100 (information obtaining unit 141) obtains guard band information which indicates a guard band within a frequency band including a first band with a first subcarrier spacing and a second band with a second subcarrier spacing. Then, the base station 100 (communication processing unit 143) transmits the guard band information to the terminal apparatus 200. Note that, for example, the base station 100 (information obtaining unit 141) obtains the guard band information by generating the guard band information.

The terminal apparatus 200 (communication processing unit 231) receives the guard band information from the base station 100. Then, the terminal apparatus 200 (communication processing unit 231) performs radio communications within the frequency band on the basis of the guard band information.

Herein, the "subcarrier" is a minimum unit of frequency over which a signal can be carried and is, as an example, an OFDM subcarrier. The "subcarrier" may be simply referred to as a carrier. The "subcarrier spacing" is a spacing with which subcarriers are arranged. The "guard band" corresponds to frequencies or a band over which no signal is transmitted and, for example, includes one or more subcarriers.

(1) Frequency Band

As described above, the frequency band includes the first band with the first subcarrier spacing and the second band with the second subcarrier spacing. In other words, the frequency band is a frequency band in which different subcarrier spacings exist. For example, the first band and the second band are adjacent to each other within the frequency band. Of course, the frequency band may further include one or more other bands (for example, a third band). Each of such one or more other bands may be a band with the first subcarrier spacing or the second subcarrier spacing or a band with another subcarrier spacing.

According to the first example embodiment, subcarrier spacings for terminal apparatuses (or services) are determined per terminal apparatus (or service) basis and a subcarrier spacing of a radio resource assigned to a terminal apparatus is determined on the basis of the subcarrier spacing for the terminal apparatus. That is, the subcarrier spacing for the terminal apparatus becomes the subcarrier spacing of the radio resource. In this case, the first band is a band including the radio resource that is assigned to the terminal apparatus using the first subcarrier spacing and the second band is a band including a radio resource that is assigned to a terminal apparatus using the second subcarrier spacing. Note that a terminal apparatus may also be referred to as a user. Hereinafter, an example of the frequency band is described with reference to FIG. 4 and FIG. 5.

Figure 4:
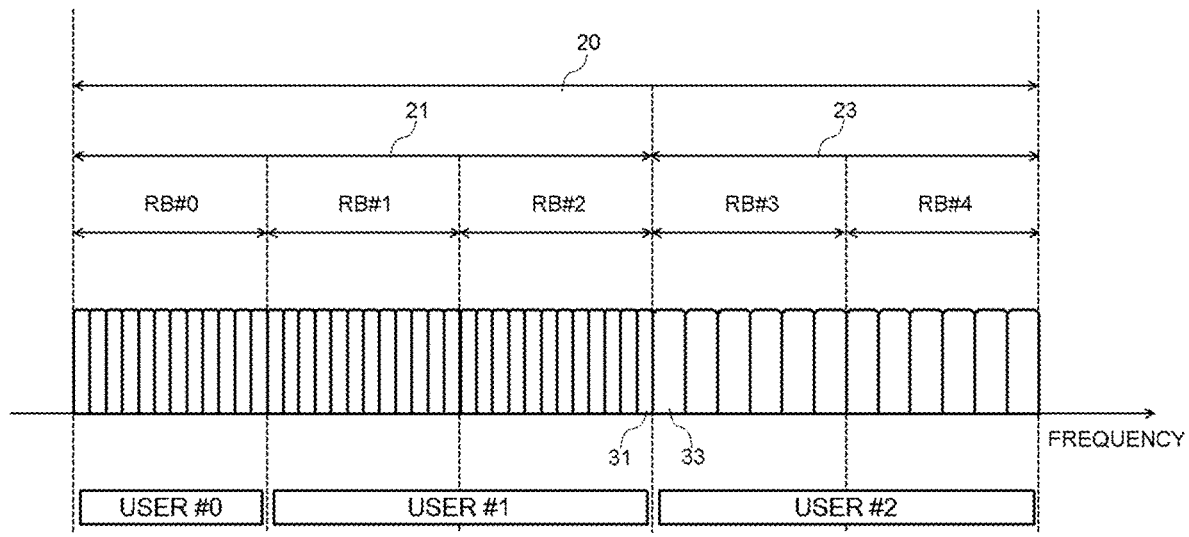
FIG. 4 is an explanatory diagram for describing a first example of a frequency band of the first example embodiment.

FIG. 4 is an explanatory diagram for describing a first example of a frequency band of the first example embodiment. Referring to FIG. 4, a frequency band 20 is illustrated. In this example, the frequency band 20 includes five resource blocks (RB) (RB #0 to RB #4) in frequency direction. The "resource block" or "RB" herein is a unit for assigning radio resources and, in other words, is a minimum radio resource that can be assigned to a terminal apparatus. In this example, the RB #0 is assigned to a user #0 which uses a subcarrier spacing of 15 kHz and the RB #1 and the RB #2 are assigned to a user #1 which similarly uses a subcarrier spacing of 15 kHz. Thus, the band 21 including the RB #0 to RB #2 becomes a band with subcarrier spacing of 15 kHz. The RB #3 and the RB #4 are assigned to a user #2 which uses a subcarrier spacing of 30 kHz. Thus, the band 23 including the RB #3 and RB #4 becomes a band with subcarrier spacing of 30 kHz. For example, the terminal apparatus 200 is the user #0, the user #1 or the user #2.

Figure 5:
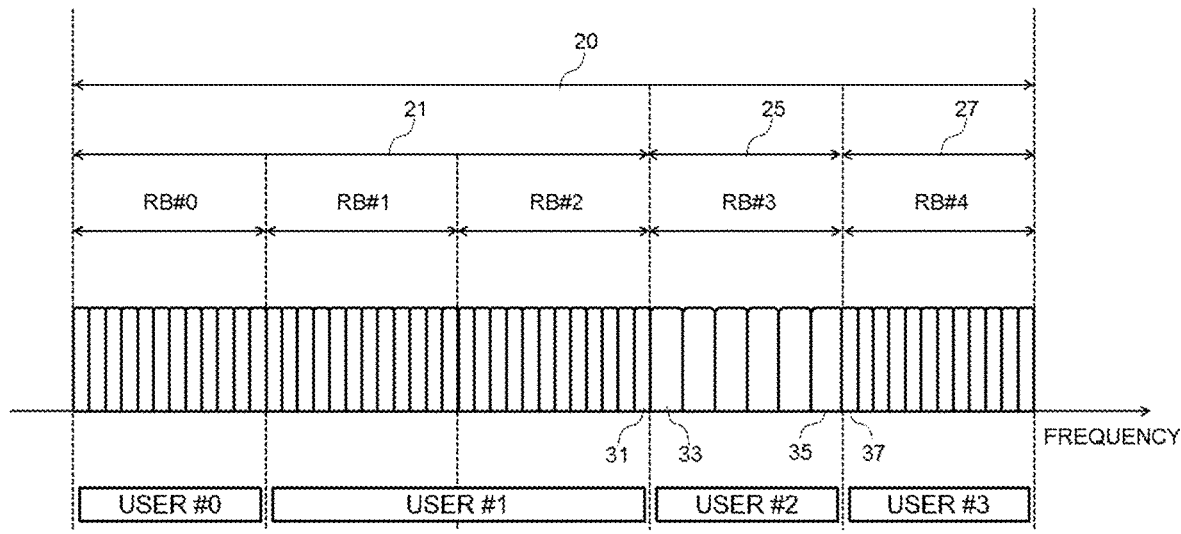
FIG. 5 is an explanatory diagram for describing a second example of a frequency band of the first example embodiment.

FIG. 5 is an explanatory diagram for describing a second example of a frequency band of the first example embodiment. Referring to FIG. 5, a frequency band 20 is illustrated. In this example, similarly to the example of FIG. 4, the RBs #0 to #2 are assigned to the users #0 and #1 which use the subcarrier spacing of 15 kHz and the band 21 including the RBs #0 to #2 becomes a band with the subcarrier spacing of 15 kHz. The RB #3 is assigned to the user #2 which uses the subcarrier spacing of 30 kHz and the band 25 including the RB #3 becomes a band with the subcarrier spacing of 30 kHz. The RB #4 is assigned to the user #3 which uses the subcarrier spacing of 15 kHz and the band 27 including the RB #4 becomes a band with the subcarrier spacing of 15 kHz. For example, the terminal apparatus 200 is the user #0, the user #1, the user #2 or the user #3.

As exemplified above, there exist different subcarrier spacings in the frequency band. Which band within the frequency band has which subcarrier spacing may be determined dynamically through radio resource assignment.

In this way, it becomes possible, for example, to accommodate different services having different demands by using different subcarrier spacings within a frequency band. More specifically, for example, using a larger subcarrier spacing in frequency direction makes a symbol duration in time direction shorter, which may lead to low latency in signal transmissions. It thus allows, for example, for accommodating a service that requires low latency. For example, using a smaller subcarrier spacing in frequency direction enables a larger number of terminal apparatuses to be connected simultaneously. It thus allows for accommodating a service that requires a large number of connections with terminal apparatuses, for example.

Note that the frequency band may be a frequency band for FDD. In this case, the frequency band may be a downlink band or an uplink band. Alternatively, the frequency band may be a frequency band for TDD.

(2) Guard Band Information

Among others, in the first example embodiment, the base station 100 (information obtaining unit 141) obtains control information for notifying a radio resource that is assigned to the terminal apparatus 200, the control information including the guard band information. Then, the base station 100 (communication processing unit 143) transmits the control information to the terminal apparatus 200. Note that, for example, the base station 100 (information obtaining unit 141) obtains the control information by generating the control information.

Control Information

For example, the control information is information transmitted every Transmission Time Interval (TTI). For example, the TTI is called subframe (as in LTE).

For example, the control information is Downlink Control Information (DCI) of LTE or corresponding information of 5G (which may be called DCI). For example, the control information includes assignment information which indicates the radio resource that is assigned to the terminal apparatus 200. Moreover, for example, the control information includes various information for control (for example, Modulation and Coding Scheme (MCS) information, Transmission Power Control information, and/or the like).

For example, the base station 100 (communication processing unit 143) transmits the control information to the terminal apparatus 200 in a band with a predetermined subcarrier spacing. As an example, the base station 100 (communication processing unit 143) may transmit the control information to the terminal apparatus 200 in a band having a predetermined subcarrier spacing (temporarily or permanently) within the frequency band. Alternatively, the base station 100 (communication processing unit 143) may transmit the control information to the terminal apparatus 200 in another band (different than the above frequency band) having a predetermined subcarrier spacing. In this way, the terminal apparatus 200 can receive the control information. Alternatively, the base station 100 (communication processing unit 143) may transmit the control information to the terminal apparatus 200 in a band with non-constant subcarrier spacing and the terminal apparatus 200 (communication processing unit 231) may attempt to receive it by trying several subcarrier spacings (that is, it may perform blind reception). Still in this way, the terminal apparatus 200 can receive the control information.

Guard Band

For example, the guard band indicated by the guard band information is narrower than a Resource Block (RB) that is a unit for assigning radio resources. This makes it possible to alleviate deterioration of frequency utilization efficiency due to the guard band (for example, compared to the case where a guard band is arranged in terms of RBs).

For example, the guard band indicated by the guard band information is a guard band in the radio resource that is assigned to the terminal apparatus 200. Specifically, for example, the guard band is a guard band located at a frequency edge of the radio resource. For example, when the radio resource is adjacent to another radio resource with a subcarrier spacing that is different than the radio resource, the guard band corresponds to one or more subcarriers adjacent to such another radio resource. Meanwhile, when the radio resource is not adjacent to such another radio resource, the guard band does not exist. This, for example, makes it possible to suppress interference on signals over another radio resource. Hereinafter, an example of the guard band indicated by the guard band information is described with reference to FIG. 6 to FIG. 7.

First Example

Figure 6:
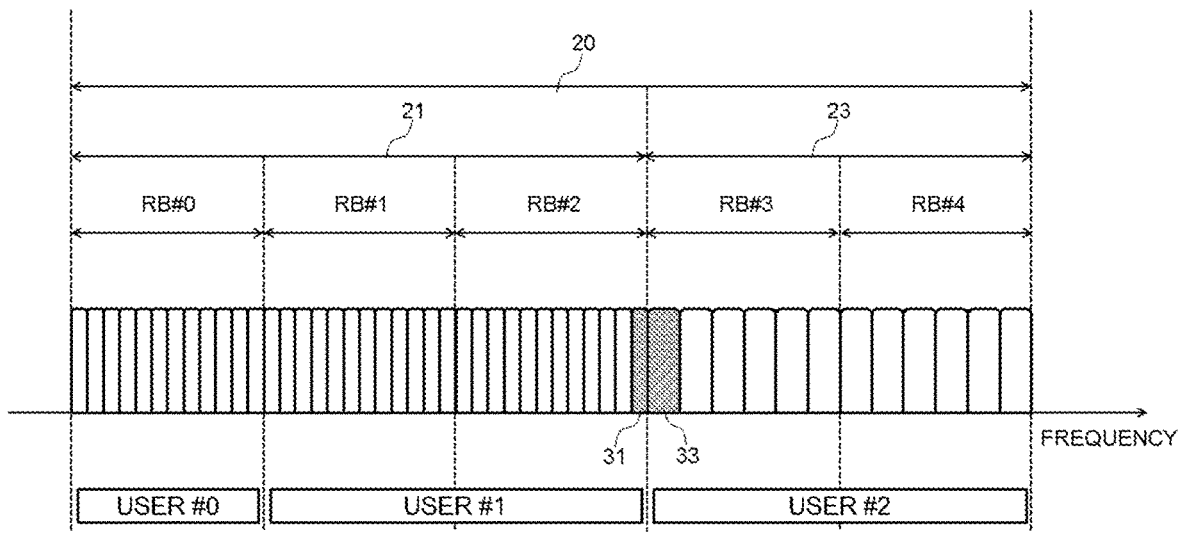
FIG. 6 is an explanatory diagram for describing a first example of a guard band indicated by guard band information.

FIG. 6 is an explanatory diagram for describing a first example of a guard band indicated by guard band information. Referring to FIG. 6, the frequency band 20, the band 21 and the band 23 are illustrated similarly to FIG. 4.

As an example, the terminal apparatus 200 is the user #1. That is, radio resources assigned to the terminal apparatus 200 (user #1) are the RB #1 and RB #2 and the subcarrier spacing of those radio resources (subcarrier spacing for the user #1) is 15 kHz. In this case, the radio resources (RB #1 and RB #2) are adjacent to the RB #3 having a different subcarrier spacing (30 kHz). Thus, the guard band indicated by the guard band information corresponds to the subcarrier 31 that is adjacent to the RB #3.

As another example, the terminal apparatus 200 may be the user #2. That is, radio resources assigned to the terminal apparatus 200 (user #2) are the RB #3 and RB #4 and the subcarrier spacing of those radio resources (subcarrier spacing for the user #2) is 30 kHz. In this case, the radio resources (RB #3 and RB #4) is adjacent to the RB #2 having a different subcarrier spacing (15 kHz). Thus, the guard band indicated by the guard band information corresponds to the subcarrier 33 that is adjacent to the RB #2.

As a yet another example, the terminal apparatus 200 may be the user #0. That is, a radio resource assigned to the terminal apparatus 200 (user #0) is the RB #0 and the subcarrier spacing of that radio resource (subcarrier spacing for the user #0) is 15 kHz. In this case, the radio resource (RB #0) is not adjacent to any RB having a different subcarrier spacing. Thus, no guard band exists indicated by the guard band information.

Second Example

Figure 7:
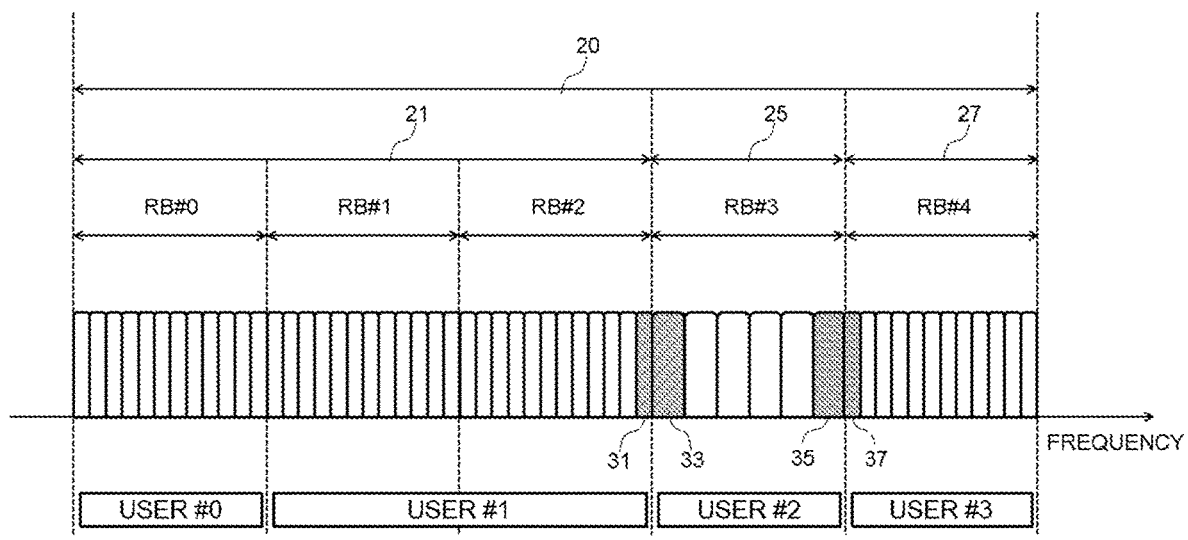
FIG. 7 is an explanatory diagram for describing a second example of a guard band indicated by guard band information.

FIG. 7 is an explanatory diagram for describing a second example of a guard band indicated by guard band information. Referring to FIG. 7, the frequency band 20, the band 25 and the band 27 are illustrated similarly to FIG. 5.

As an example, the terminal apparatus 200 is the user #2. That is, a radio resource assigned to the terminal apparatus 200 (user #2) is the RB #3 and the subcarrier spacing of that radio resource (subcarrier spacing for the user #2) is 30 kHz. In this case, the radio resource (RB #3) is adjacent to the RB #2 and the RB #4 having a different subcarrier spacing (15 kHz). Thus, the first guard band indicated by the guard band information corresponds to the subcarrier 33 that is adjacent to the RB #2 and the second guard band indicated by the guard band information corresponds to the subcarrier 35 that is adjacent to the RB #4.

As another example, the terminal apparatus 200 may be the user #3. That is, a radio resource assigned to the terminal apparatus 200 (user #3) is the RB #4 and the subcarrier spacing of that radio resource (subcarrier spacing for the user #3) is 15 kHz. In this case, the radio resource (RB #4) is adjacent to the RB #3 having a different subcarrier spacing (30 kHz). Thus, the guard band indicated by the guard band information corresponds to the subcarrier 37 that is adjacent to the RB #3.

As yet another example, the terminal apparatus 200 may be the user #1. In this case, similarly to the example described with reference to FIG. 6, the guard band indicated by the guard band information corresponds to the subcarrier 31 that is adjacent to the RB #3.

As yet another example, the terminal apparatus 200 may be the user #0. In this case, similarly to the example described with reference to FIG. 6, no guard band exists indicated by the guard band information.

Note that, though the examples have been described with reference to FIG. 6 and FIG. 7 in which a guard band corresponds to one subcarrier for each frequency edge, the first example embodiment is, of course, not limited to those examples. A guard band may correspond to two or more subcarriers for each frequency edge.

The guard bands described above, for example, makes it possible to suppress interference between subcarriers (in particular, interference between subcarriers with different subcarrier spacings) even when there are different subcarrier spacings within a frequency band.

Guard Band Information

For example, the guard band information indicates presence or absence of a guard band in the radio resource assigned to the terminal apparatus 200. More specifically, for example, the guard band information indicates that there is a guard band at a first frequency edge of the radio resource, that there is a guard band at a second frequency edge of the radio resource, that there are guard bands at both frequency edges of the radio resource, or that there is no guard band at both frequency edges of the radio resource. For example, the first frequency edge is the frequency edge on the higher frequency side and the second frequency edge is the frequency edge on the lower frequency side.

As an example, the guard band information may be guard band identifier field (two bits long) included in the control information (for example, DCI) and can take two bits values as follows:

00: No Guard Band
01: Guard Band Exists Only at First Frequency Edge
10: Guard Band Exists Only at Second Frequency Edge
11: Guard Bands Exist at Both Frequency Edges Namely, each bit of the two bits indicates whether there is a guard band at the frequency edge or not (no guard band exists if the bit indicates zero and a guard band exists if the bit indicates one).

In the example of FIG. 6, "00" as guard band information is transmitted to the user #0, "01" as guard band information is transmitted to the user #1 and "10" as guard band information is transmitted to the user #2.

In the example of FIG. 7, "00" as guard band information is transmitted to the user #0, "01" as guard band information is transmitted to the user #1, "11" as guard band information is transmitted to the user #2 and "10" as guard band information is transmitted to the user #3.

Note that the width of the guard band is not limited to a fixed number of subcarriers. The width of the guard band may be varied. For example, in such a case, the guard band information may indicate the width of the guard band and may have a longer bit length. As an example, the guard band information may indicate the width of the guard band by one more bit. The width of the guard band may be one subcarrier if the bit indicates zero and the width of the guard band may be two subcarriers if the bit indicates one. For example, this makes it possible to dynamically set up the width of the guard band as needed.

As stated, according to the first example embodiment, the above control information includes the guard band information and the base station 100 transmits the control information to the terminal apparatus 200. This, for example, makes it possible to set up a guard band in a fine manner per user and per TTI (subframe). Thus, interference between subcarriers (for example, interference between users using different subcarrier spacings) can be suppressed even when there are different subcarrier spacings within the frequency band and the spacings dynamically change.

Others

As described above, for example, a subcarrier spacing for a terminal apparatus (or service) is determined for each terminal apparatus (or service) and a subcarrier spacing of the radio resource assigned to the terminal apparatus 200 is determined on the basis of the subcarrier spacing for the terminal apparatus 200. That is, the subcarrier spacing for the terminal apparatus 200 becomes the subcarrier spacing of a radio resource assigned to the terminal apparatus 200. However, the first example embodiment is not limited to this example.

For example, no subcarrier spacing for the terminal apparatus 200 may be preset and subcarrier spacings used by the terminal apparatus 200 may vary dynamically. In this case, the control information may include subcarrier spacing information indicative of a subcarrier spacing of the radio resource assigned to the terminal apparatus 200.

(3) Radio Communications

Base Station

For example, the frequency band is a frequency band used by the base station 100. In this case, the base station 100 (communication processing unit 143) uses one or more subcarriers in the frequency band as a guard band to perform radio communications within the frequency band. The radio communication may be downlink transmission or uplink reception.

For example, the first band and the second band are adjacent to each other within the frequency band and the one or more subcarriers (guard band) includes one or more subcarriers near a boundary between the first band and the second band. More specifically, for example, such one or more subcarriers near the boundary include one or more subcarriers within the first band that are adjacent to the second band or one or more subcarriers within the second band that are adjacent to the first band.

In the example of FIG. 6, the base station 100 uses the subcarriers 31, 33 near the boundary between the band 21 and the band 23 as a guard band to perform radio communications within the frequency band 20.

In the example of FIG. 7, the base station 100 uses the subcarriers 31, 33 near the boundary between the band 21 and the band 25 as a guard band and also uses the subcarriers 35, 37 near the boundary between the band 25 and the band 27 as a guard band to perform radio communications within the frequency band 20.

This, for example, makes it possible that there exist different subcarrier spacings within a frequency band while suppressing interference between subcarriers.

Terminal Apparatus

As described above, the terminal apparatus 200 (communication processing unit 231) receives the guard band information from the base station 100 and performs radio communications within the frequency band on the basis of the guard band information.

For example, the terminal apparatus 200 (communication processing unit 231) receives control information (for example, DCI) and obtains assignment information and guard band information included in the control information. Then, the terminal apparatus 200 (communication processing unit 231) identifies a radio resource assigned to the terminal apparatus 200 from the assignment information and identifies a guard band in the radio resource from the guard band information. If there exist one or more subcarriers as a guard band in the radio resource, the terminal apparatus 200 (communication processing unit 231) uses the one or more subcarriers as a guard band to perform radio communications within the frequency band. The radio communication may be downlink reception or uplink transmission.

For example, the first band and the second band are adjacent to each other within the frequency band and the one or more subcarriers (guard band) includes one or more subcarriers near a boundary between the first band and the second band. More specifically, for example, such one or more subcarriers near the boundary include one or more subcarriers within the first band that are adjacent to the second band or one or more subcarriers within the second band that are adjacent to the first band.

In the example of FIG. 6, as an example, the terminal apparatus 200 is the user #1 and the terminal apparatus 200 uses the subcarriers 31 near the boundary between the band 21 and the band 23 as a guard band to perform radio communications within the frequency band 20 (RB #1 and RB #2).

In the example of FIG. 7, as an example, the terminal apparatus 200 is the user #2 and the terminal apparatus 200 uses the subcarriers 33 near the boundary between the band 21 and the band 25 as a guard band and also uses the subcarriers 35 near the boundary between the band 25 and the band 27 as a guard band to perform radio communications within the frequency band 20 (RB #3).

Downlink Reception

For example, the terminal apparatus 200 (communication processing unit 231) performs reception within the frequency band on the basis of the guard band information. More specifically, for example, the reception within the frequency band includes extracting a symbol from a resource element within the frequency band on the basis of the guard band information. Such extraction of a symbol may be referred to as symbol de-mapping.

In the example of FIG. 6, as an example, the terminal apparatus 200 is the user #1 and the terminal apparatus 200 extracts symbols from resource elements contained in the RB #1 and the RB #2. In this case, the terminal apparatus 200 does not extract any symbol from resource elements of the subcarrier 31 and extracts symbols from resource elements in the other subcarriers.

In the example of FIG. 7, as an example, the terminal apparatus 200 is the user #2 and the terminal apparatus 200 extracts symbols from resource elements contained in the RB #3. In this case, the terminal apparatus 200 does not extract any symbol from resource elements of the subcarriers 33, 35 and extracts symbols from resource elements of the other subcarriers.

Uplink Transmission

The terminal apparatus 200 (communication processing unit 231) may perform transmission within the frequency band on the basis of the guard band information. More specifically, the transmission within the frequency band may include mapping a symbol to a resource element within the frequency band on the basis of the guard band information.

In the example of FIG. 6, as an example, the terminal apparatus 200 is the user #1 and the terminal apparatus 200 maps symbols to resource elements contained in the RB #1 and the RB #2. In this case, the terminal apparatus 200 does not map any symbol to resource elements of the subcarrier 31 and maps symbols to resource elements of the other subcarriers.

In the example of FIG. 7, as an example, the terminal apparatus 200 is the user #2 and the terminal apparatus 200 maps symbols to resource elements contained in the RB #3. In this case, the terminal apparatus 200 does not map any symbol to resource elements of the subcarriers 33, 35 and maps symbols to resource elements of the other subcarriers.

(4) Process Flow

Examples of processes of the first example embodiment are described with reference to FIG. 8 and FIG. 9.

Downlink

Figure 8:
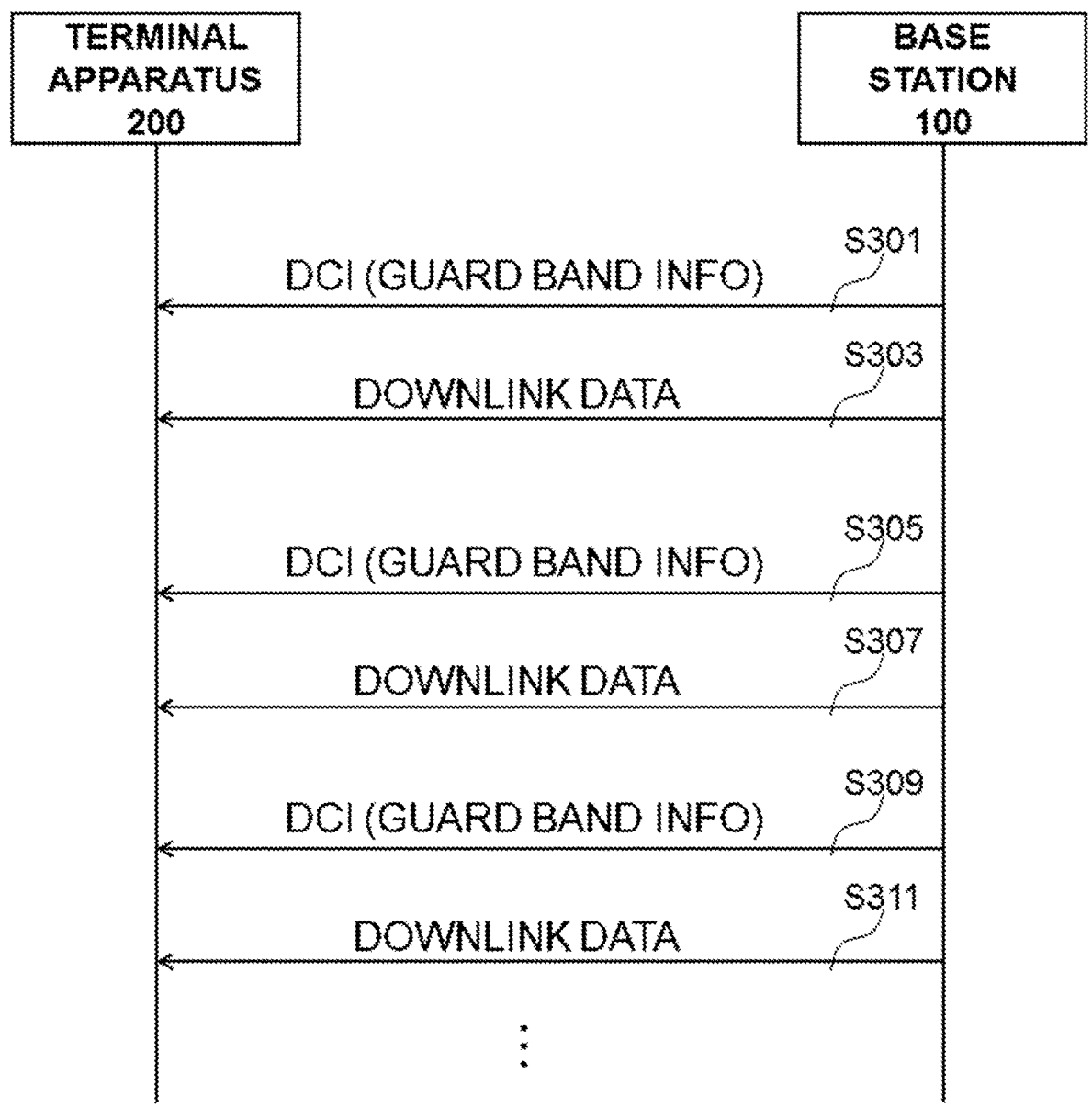
FIG. 8 is a sequence diagram for describing a first example of a schematic flow of a process of the first example embodiment.

FIG. 8 is a sequence diagram for describing a first example of a schematic flow of a process of the first example embodiment. The first example is an example where the base station 100 transmits downlink data to the terminal apparatus 200.

The base station 100 obtains DCI for the terminal apparatus 200 by generating it and transmits the DCI to the terminal apparatus 200 (S301). The terminal apparatus 200 receives the DCI. The DCI includes assignment information which indicates a radio resource assigned to the terminal apparatus 200 and guard band information which indicates a guard band in the radio resource. The radio resource is a radio resource within a frequency band in which different subcarrier spacings exist. The radio resource is a downlink radio resource. The frequency band may be a downlink band of FDD. Alternatively, the frequency band may be a frequency band of TDD and the radio resource may be a radio resource in a downlink subframe.

Further, the base station 100 transmits downlink data to the terminal apparatus 200 in the radio resource (S303). The terminal apparatus 200 receives the downlink data in the radio resource indicated by the assignment information.

For example, the radio resource is adjacent to another radio resource with a subcarrier spacing that is different than the radio resource. In this case, the base station 100 uses one or more subcarriers as a guard band that are adjacent to such another radio resource to transmit the downlink data in the radio resource. As the guard band information indicates, as a guard band, the one or more subcarriers that are adjacent to such another radio resource, the terminal apparatus 200 uses the one or more subcarriers as the guard band to receive the downlink data in the radio resource.

Alternatively, the radio resource is not adjacent to such another radio resource. In this case, the base station 100 transmits the downlink data in the radio resource without any guard band. As the guard band information indicates that there is no guard band in the radio resource, the terminal apparatus 200 receives the downlink data in the radio resource without any guard band.

Similar actions to steps S301 and S303 are also performed at steps S305, S307 and steps S309, S311.

Uplink

Figure 9:
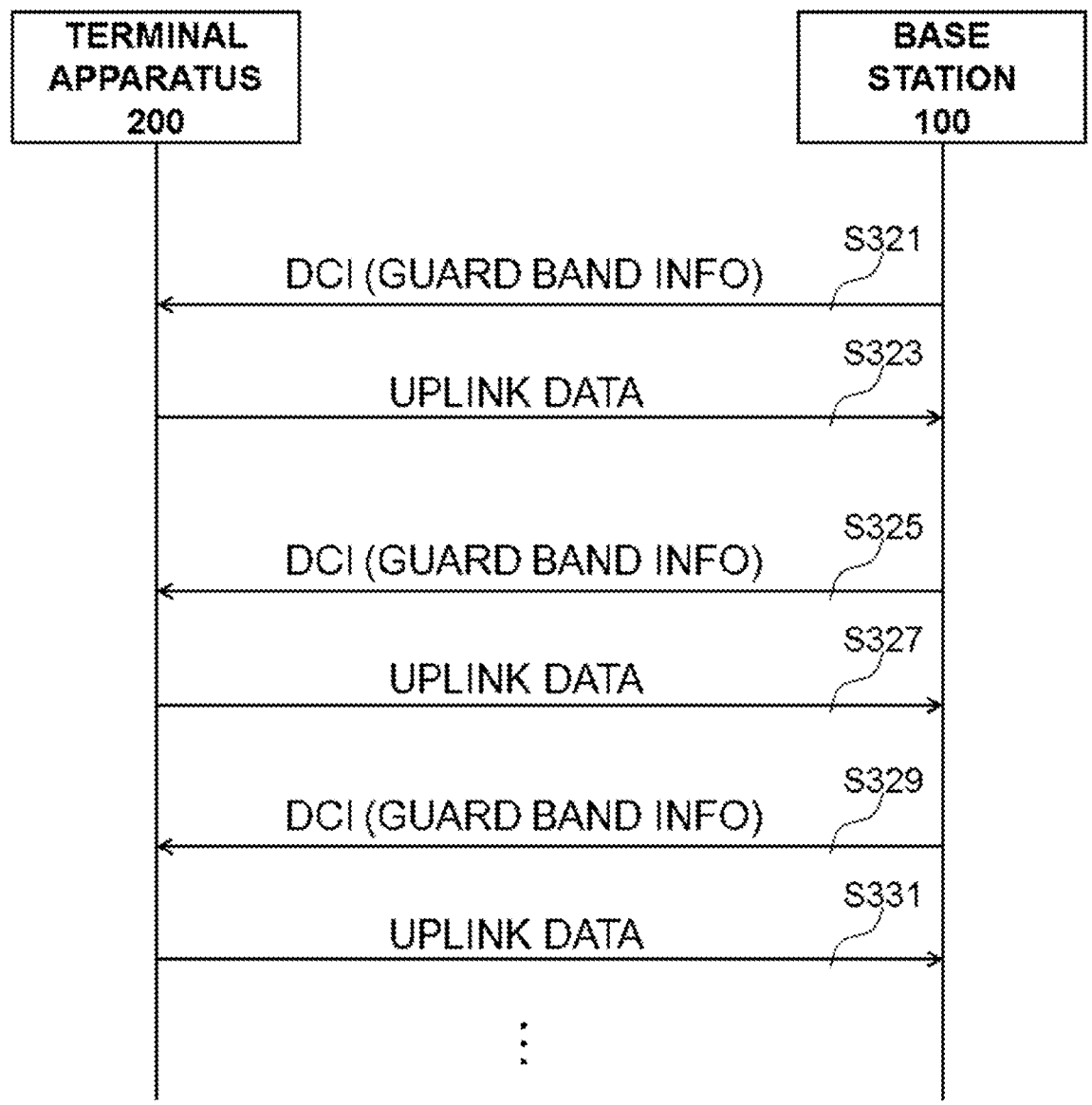
FIG. 9 is a sequence diagram for describing a second example of a schematic flow of a process of the first example embodiment.

FIG. 9 is a sequence diagram for describing a second example of a schematic flow of a process of the first example embodiment. The second example is an example where the terminal apparatus 200 transmits uplink data to the base station 100.

The base station 100 obtains DCI for the terminal apparatus 200 by generating it and transmits the DCI to the terminal apparatus 200 (S321). The terminal apparatus 200 receives the DCI. The DCI includes assignment information which indicates a radio resource assigned to the terminal apparatus 200 and guard band information which indicates a guard band in the radio resource. The radio resource is a radio resource within a frequency band in which different subcarrier spacings exist. The radio resource is an uplink radio resource. The frequency band may be an uplink band of FDD. Alternatively, the frequency band may be a frequency band of TDD and the radio resource may be a radio resource in an uplink subframe.

Further, the terminal apparatus 200 transmits uplink data in the radio resource indicated by the assignment information (S323). The base station 100 receives the uplink data in the radio resource.

For example, the radio resource is adjacent to another radio resource with a subcarrier spacing that is different than the radio resource. In this case, as the guard band information indicates one or more subcarriers as a guard band that are adjacent to such another radio resource, the terminal apparatus 200 uses the one or more subcarriers as the guard band to transmit the uplink data in the radio resource. The base station 100 uses the one or more subcarriers as a guard band that are adjacent to such another radio resource to receive the uplink data in the radio resource.

Alternatively, the radio resource is not adjacent to such another radio resource. In this case, as the guard band information indicates that there is no guard band in the radio resource, the terminal apparatus 200 transmits the uplink data in the radio resource without any guard band. The base station 100 receives the uplink data in the radio resource without any guard band.

Similar actions to steps S321 and S323 are also performed at steps S325, S327 and steps S329, S331.

(5) Meanings of "Transmission"/"Reception"/"Radio Communications"

As used herein, "transmit"/"perform transmission" means that, for example, at least one protocol layer out of a plurality of protocol layers performs transmission process and does not necessarily mean outputting wired or wireless signals. Similarly, as used herein, "receive"/"perform reception" means that, for example, at least one protocol layer out of a plurality of protocol layers performs reception process. Similarly, as used herein, "perform radio communications"

means that, for example, at least one protocol layer out of a plurality of protocol layers performs reception process or transmission process. As an example, such a plurality of protocol layers correspond to physical layer, Media Access Control (MAC) layer, Radio Link Control (RLC) layer, Packet Data Convergence Protocol (PDCP) layer and Radio Resource Control (RRC) layer. As another example, such a plurality of protocol layers correspond to physical layer, MAC layer, Internet Protocol (IP) layer and transport layer.

As used herein, "transmit X to Y" is not limited to transmitting X directly to Y but includes transmitting X indirectly to Y (that is, transmitting X to another node which forwards it thereby X is delivered to Y). Similarly, as used herein, "receive X from Y" is not limited to receiving X directly from Y but includes receiving X indirectly from Y (that is, receiving X which was transmitted by Y and then forwarded by another node).

<2.5. Example Alterations>

Next, with reference to FIG. 10 to FIG. 13, example alterations of the first example embodiment are described.

In the example of the first example embodiment, the frequency band is a frequency band that is used by the base station 100. That is, the base station 100 performs radio communications within the frequency band.

Meanwhile, in an example alteration of the first example embodiment, the frequency band is used by another base station which is different than the base station 100. That is, the base station 100 transmits the control information for the frequency band and another base station performs radio communications within the frequency band.

(1) Configuration of System

Figure 10:
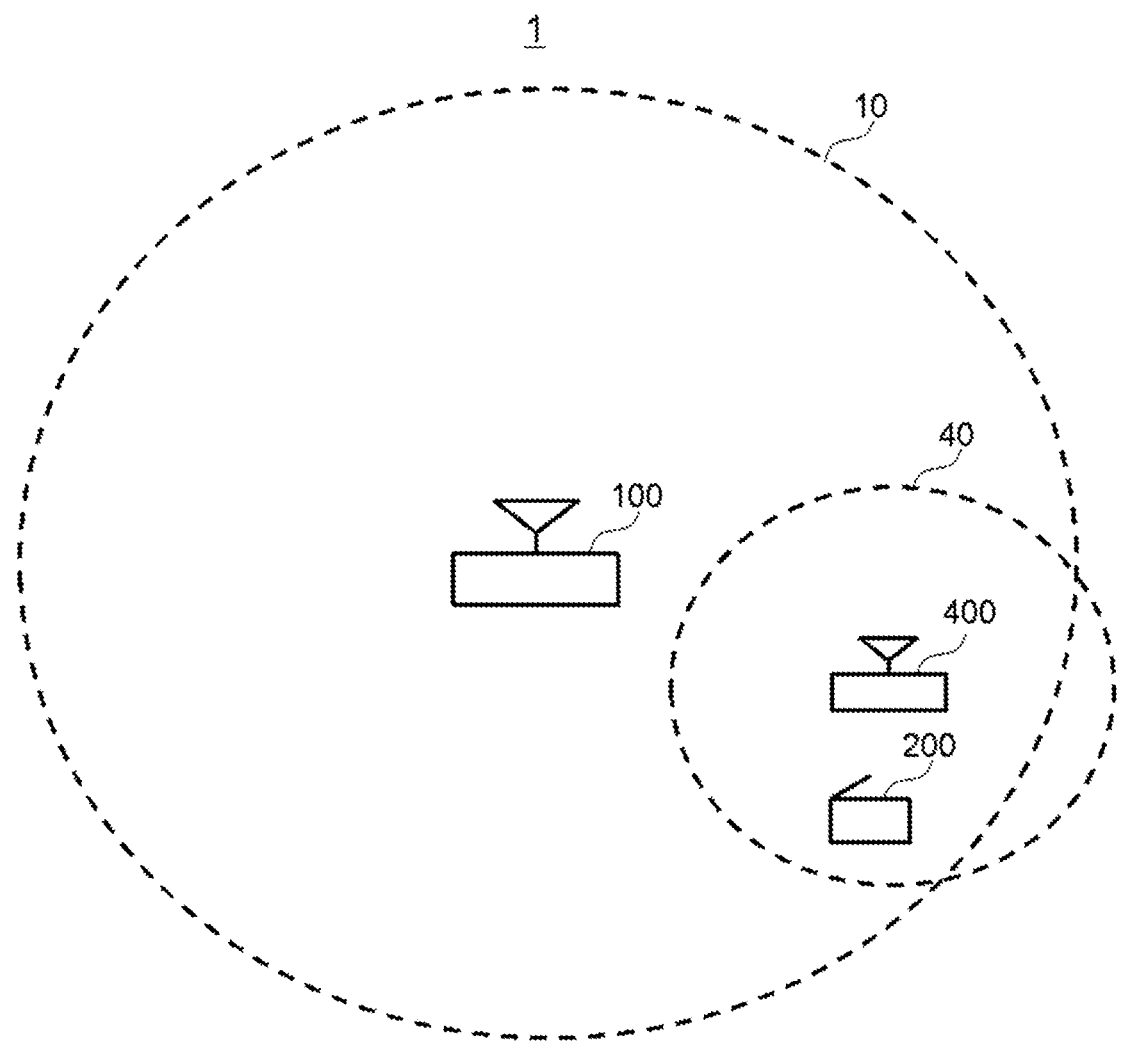
FIG. 10 is an explanatory diagram illustrating an example of a schematic configuration of a system of an example alteration of the first example embodiment.

FIG. 10 is an explanatory diagram illustrating an example of a schematic configuration of a system 1 of an example alteration of the first example embodiment. Referring to FIG. 10, in the example alteration, the system 1 further includes the base station 400 in addition to the base station 100 and the terminal apparatus 200.

The base station 400 is configured to perform radio communications with terminal apparatuses (for example, the terminal apparatus 200) located within a cell 40 (or coverage area 40). For example, the base station 400 is configured to transmit signals to a terminal apparatus in downlink and receive signals from a terminal apparatus in uplink.

Among others, in the example alteration, the terminal apparatus 200 is capable of performing radio communications with both of the base station 100 and the base station 400 simultaneously. In other words, the terminal apparatus 200 can be connected to both of the base station 100 and the base station 400, simultaneously. For example, the terminal apparatus 200 performs radio communications with the base station 100 while also performing radio communications with the base station 400.

As illustrated in FIG. 10, for example, the cell 10 of the base station 100 is a macro cell and the cell 40 of the base station 400 is a small cell. However, the example alteration is not limited to this example. In an opposite fashion, the cell 10 of the base station 100 may be a small cell and the cell 40 of the base station 400 may be a macro cell. Alternatively, the cell 10 of the base station 100 and the cell 40 of the base station 400 may be the same type of cells (for example, macro cells or small cells).

For example, the base station 400 uses OFDM as a radio access scheme. Alternatively, the base station 400 may use another radio access scheme (e.g. Filtered OFDM, UFMC, GFDM or the like). Such a radio access scheme may be a scheme for downlink or a scheme for uplink. The schemes for downlink and uplink may be different schemes or the identical scheme.

The base station 400 is a node that performs radio communications with terminal apparatuses and, in other words, is a RAN node. For example, the base station 400 may be a Node B, H-Node B, eNodeB, or H-eNodeB or may be gNodeB in 5G. The base station 400 may include a plurality of units (or plurality of nodes). The plurality of units (or plurality of nodes) may include a first unit (or first node) for performing processing of a lower protocol layer and a second unit (or second node) for performing processing of a higher protocol layer. As an example, the first unit may be referred to as Distributed Unit (DU) or Access Unit (AU) and the second unit may be referred to as Center/Central Unit (CU). As another example, the first unit may be referred to as Radio Unit (RU) or Remote Unit (RU) and the second unit may be referred to as Digital Unit (DU). The RU may be an RRH or an RRU and the DU may be a BBU. Of course, the names of the first unit (first node) and the second unit (second node) are not limited to such examples. Alternatively, the base station 400 may be a single unit (or single node). In this case, the base station 400 may be one of the plurality of units (for example, one of the first and second units) and may be connected to another unit of the plurality of units (for example, the other one of the first and second units).

(2) Configuration of Base Station 400

Figure 11:
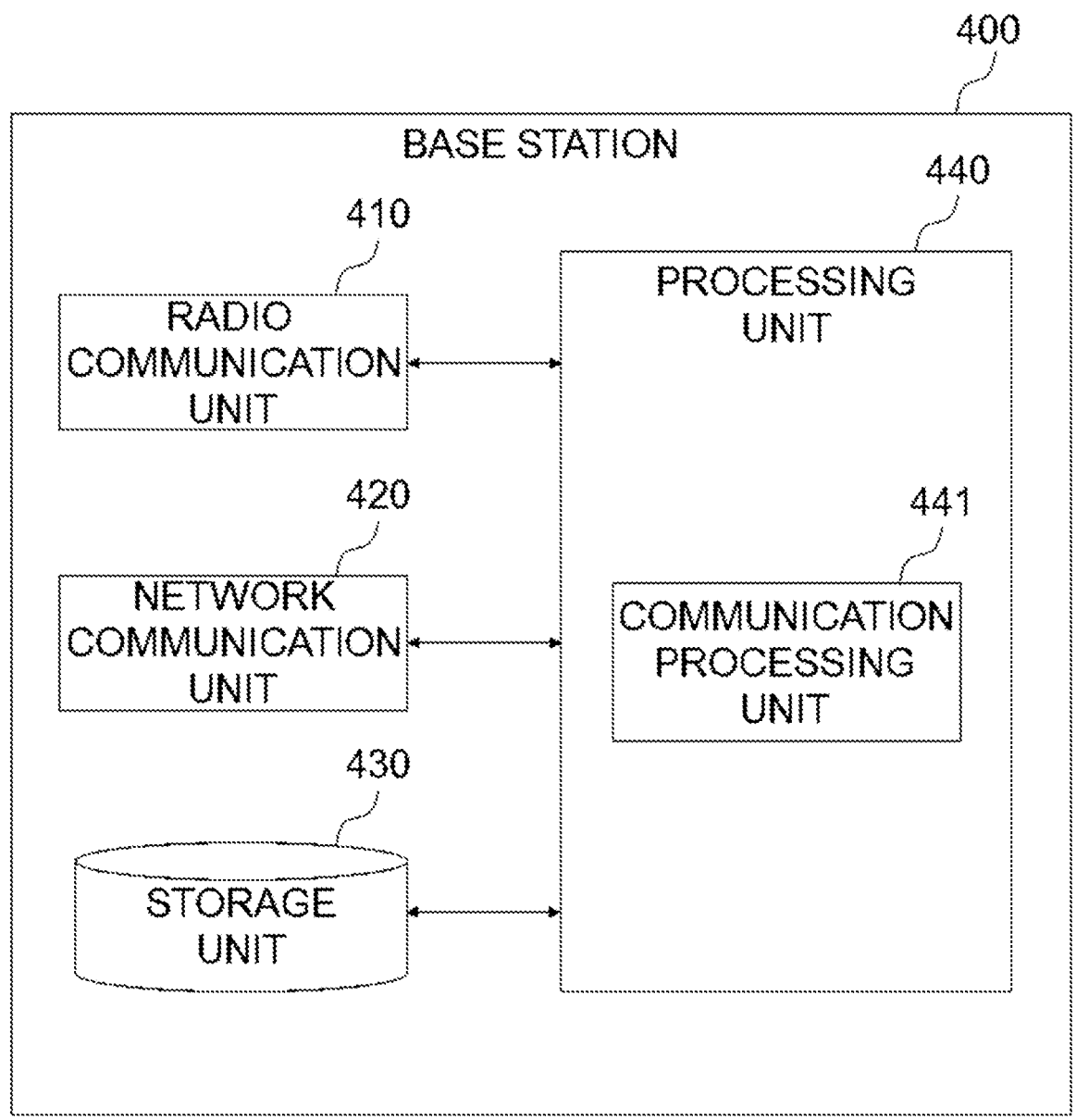
FIG. 11 is a block diagram illustrating an example of a schematic configuration of a base station of the example alteration of the first example embodiment.

FIG. 11 is a block diagram illustrating an example of a schematic configuration of the base station 400 of the example alteration of the first example embodiment. Referring to FIG. 11, the base station 400 includes a radio communication unit 410, a network communication unit 420, a storage unit 430 and a processing unit 440.

Radio Communication Unit 410

The radio communication unit 410 is configured to wirelessly transmit and receive signals. For example, the radio communication unit 410 is configured to receive signals from a terminal apparatus and transmit signals to a terminal apparatus.

Network Communication Unit 420

The network communication unit 420 is configured to receive signals from a backhaul and transmit signals to the backhaul.

Storage Unit 430

The storage unit 430 is configured to store programs and parameters for operation of the base station 400 as well as various data temporarily or permanently.

Processing Unit 440

The processing unit 440 is configured to provide various functions of the base station 400. The processing unit 440 includes a communication processing unit 441. Note that the processing unit 440 may further include another constituent element than the communication processing unit 441. That is, the processing unit 440 may perform operations other than the operations of the communication processing unit 441. Specific actions of the communication processing unit 441 will be described in detail later.

For example, the processing unit 440 (communication processing unit 441) communicates with terminal apparatuses (for example, the terminal apparatus 200) via the radio communication unit 410. For example, the processing unit 440 communicates with other network nodes via the network communication unit 420.

Example Implementations

The radio communication unit 410 may be implemented with an antenna, a high frequency (RF) circuit and the like.

The network communication unit 420 may be implemented with a network adapter, a network interface card or the like. The storage unit 430 may be implemented with a memory (for example, non-volatile memory and/or volatile memory), hard disc and/or the like. The processing unit 440 may be implemented with a Base Band (BB) processor, another processor and/or the like. The above memory (storage unit 430) may be included in such a processor (a chip).

The base station 400 may include a memory that stores programs and one or more processors that are capable of executing the programs and the one or more processors may execute the operations of the processing unit 440 (the communication processing unit 441). The programs may be programs for causing the one or more processors to execute the operations of the processing unit 440 (the communication processing unit 441).

(3) Technical Features (Radio Communications)

Among others, in the example alterations, the frequency band (that is, the frequency band in which different subcarrier spacings exist) is a frequency band that is not used by the base station 100 but used by the base station 400. That is, not the base station 100 but the base station 400 (communication processing unit 441) uses one or more subcarrier spacings in the frequency band as a guard band to perform radio communications within the frequency band. The radio communication may be downlink transmission or uplink reception.

In the example of FIG. 6, the base station 400 uses the subcarriers 31, 33 near the boundary between the band 21 and the band 23 as a guard band to perform radio communications within the frequency band 20.

In the example of FIG. 7, the base station 400 uses the subcarriers 31, 33 near the boundary between the band 21 and the band 25 as a guard band and also uses the subcarriers 35, 37 near the boundary between the band 25 and the band 27 as a guard band to perform radio communications within the frequency band 20.

(4) Technical Features (Process Flow)

Examples of processes of the example alteration of the first example embodiment are described with reference to FIG. 12 and FIG. 13.

Downlink

Figure 12:
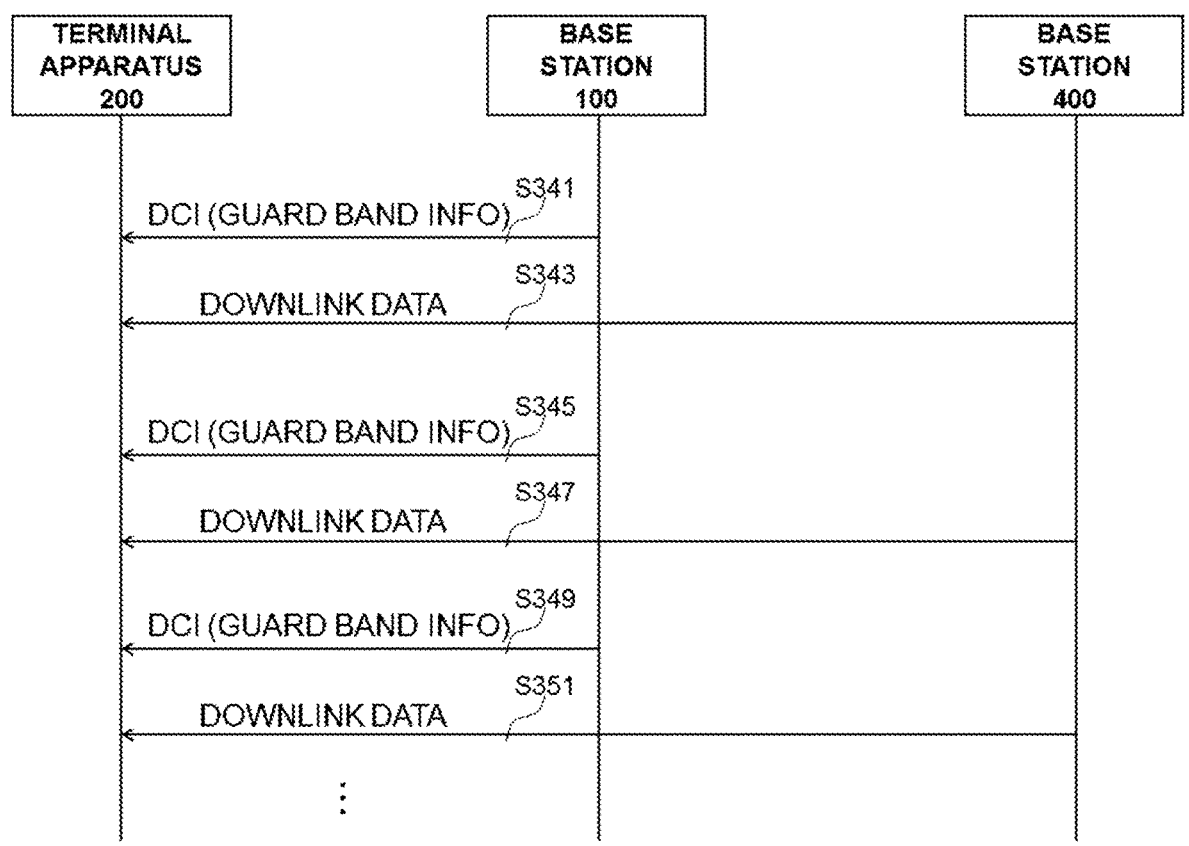
FIG. 12 is a sequence diagram for describing a first example of a schematic flow of a process of the example alteration of the first example embodiment.

FIG. 12 is a sequence diagram for describing a first example of a schematic flow of a process of the example alteration of the first example embodiment. The first example is an example where the base station 400 transmits downlink data to the terminal apparatus 200.

Descriptions about the step S341 can be done similarly to the descriptions about the step S301 in the example of FIG. 8. Hence, duplicate descriptions are herein omitted.

The base station 400 transmits downlink data to the terminal apparatus 200 in a radio resource assigned to the terminal apparatus 200 (S343). The terminal apparatus 200 receives the downlink data in the radio resource indicated by the assignment information in DCI.

For example, the radio resource is adjacent to another radio resource with a subcarrier spacing that is different than the radio resource. In this case, the base station 400 uses one or more subcarriers as a guard band that are adjacent to such another radio resource to transmit the downlink data in the radio resource. As the guard band information in the DCI indicates, as a guard band, the one or more subcarriers that are adjacent to such another radio resource, the terminal apparatus 200 uses the one or more subcarriers as the guard band to receive the downlink data in the radio resource.

Alternatively, the radio resource is not adjacent to such another radio resource. In this case, the base station 400 transmits the downlink data in the radio resource without any guard band. As the guard band information indicates that there is no guard band in the radio resource, the terminal apparatus 200 receives the downlink data in the radio resource without any guard band.

Similar actions to steps S341 and S343 are also performed at steps S345, S347 and steps S349, S351.

Uplink

Figure 13:
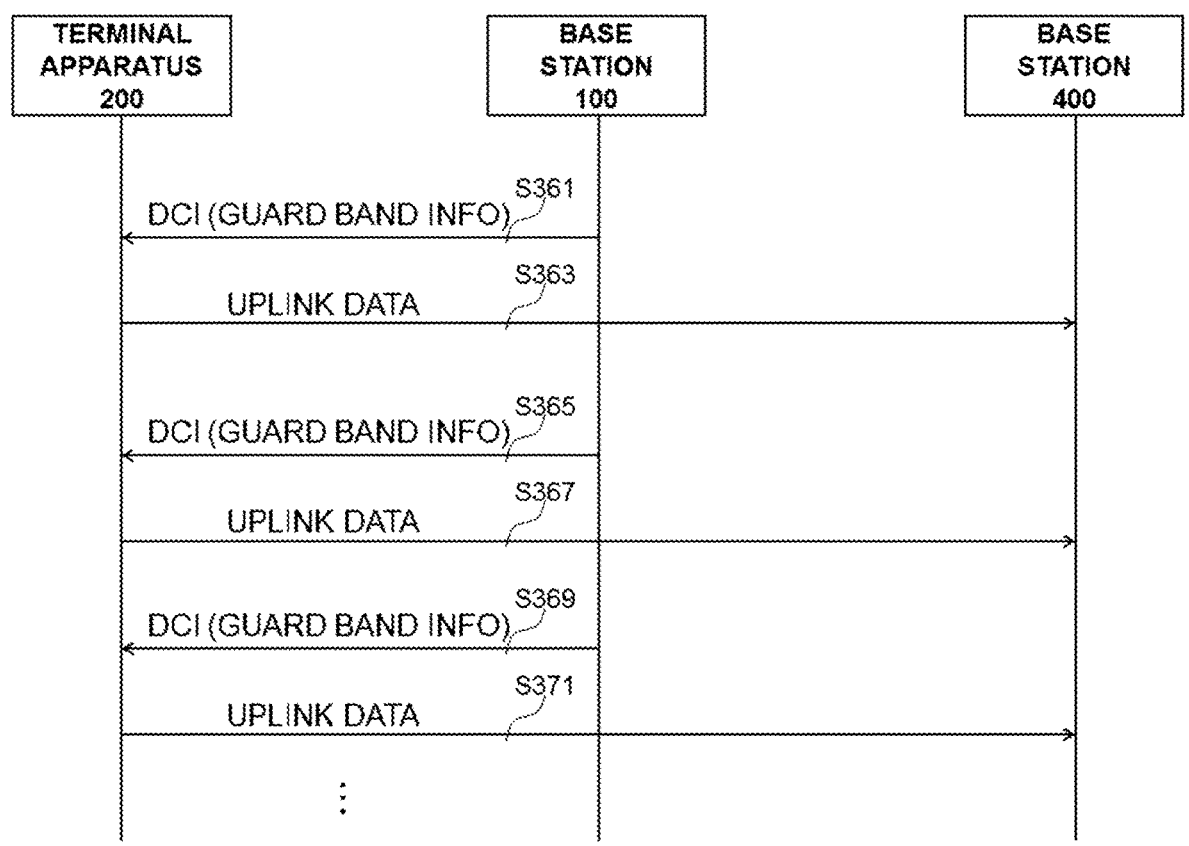
FIG. 13 is a sequence diagram for describing a second example of a schematic flow of a process of the example alteration of the first example embodiment.

FIG. 13 is a sequence diagram for describing a second example of a schematic flow of a process of the example alteration of the first example embodiment. The second example is an example where the terminal apparatus 200 transmits uplink data to the base station 400.

Descriptions about the step S361 can be done similarly to the descriptions about the step S321 in the example of FIG. 9. Hence, duplicate descriptions are herein omitted.

The terminal apparatus 200 transmits uplink data in the radio resource indicated by the assignment information in DCI (S363). The base station 400 receives the uplink data in the radio resource.

For example, the radio resource is adjacent to another radio resource with a subcarrier spacing that is different than the radio resource. In this case, as the guard band information in the DCI indicates one or more subcarriers as a guard band that are adjacent to such another radio resource, the terminal apparatus 200 uses the one or more subcarriers as the guard band to transmit the uplink data in the radio resource. The base station 400 uses the one or more subcarriers as a guard band that are adjacent to such another radio resource to receive the uplink data in the radio resource.

Alternatively, the radio resource is not adjacent to such another radio resource. In this case, as the guard band information indicates that there is no guard band in the radio resource, the terminal apparatus 200 transmits the uplink data in the radio resource without any guard band. The base station 400 receives the uplink data in the radio resource without any guard band.

Similar actions to steps S361 and S363 are also performed at steps S365, S367 and steps S369, S371.

(5) Others

For example, scheduling for the frequency band (for example, assignment of radio resources, determination of guard bands and the like) is carried out by the base station 100 (processing unit 140). In this case, the base station 100 (processing unit 140) transmits a result of the scheduling (for example, information corresponding to the control information) to the base station 400.

Alternatively, the scheduling may be carried out by the base station 400 (processing unit 440). In this case, the base station 400 (processing unit 440) may transmit a result of the scheduling (for example, information corresponding to the control information) to the base station 100. In the case where the base station 400 generates the control information itself and transmits the control information itself to the base station 100, the base station 100 (information obtaining unit 141) does not generate the control information by itself and may obtain the control information from the base station 400. The base station 400 (processing unit 440) may further include an information generation unit that generates the control information.

3. Second Example Embodiment

Next, a second example embodiment of the present invention will be described with reference to FIG. 14 to FIG. 24.

In the first example embodiment, as described above, for example, subcarrier spacings and guard bands are dynamically configured in a frequency band. Meanwhile, in the second example embodiment, subcarrier spacings and guard bands are semi-statically configured in a frequency band.

<3.1. Configuration of System>

Figure 14:
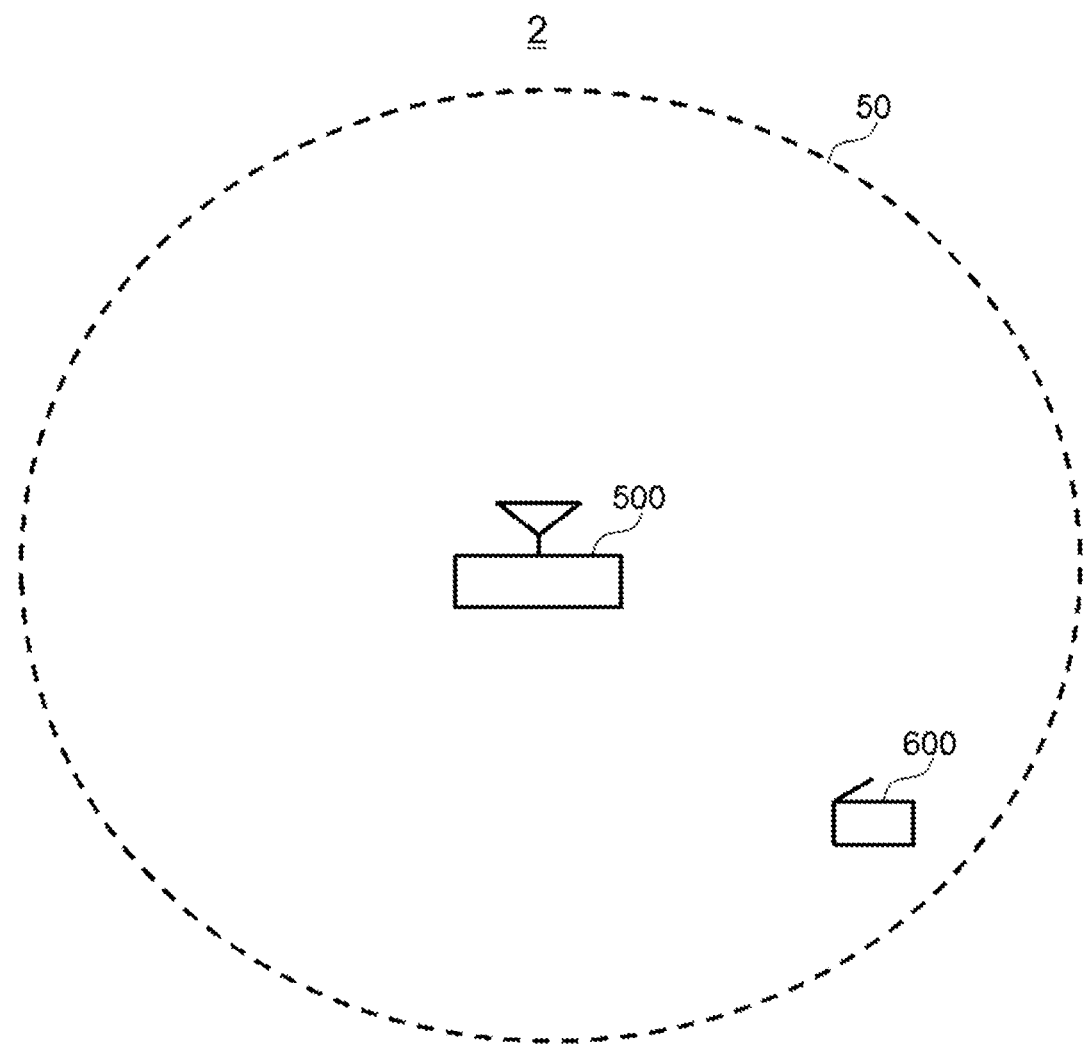
FIG. 14 is an explanatory diagram illustrating an example of a schematic configuration of a system of a second example embodiment.

An example of a configuration of a system 2 of the second example embodiment is described with reference to FIG. 14. FIG. 14 is an explanatory diagram illustrating an example of a schematic configuration of the system 2 of the second example embodiment. Referring to FIG. 14, the system 2 includes a base station 500 and a terminal apparatus 600.

Descriptions herein about the system 2, the base station 500 and the terminal apparatus 600 can be done similarly to the foregoing descriptions about the system 1, the base station 100 and the terminal apparatus 200 of the first example embodiment in <2.1. Configuration of System> except for the differences in reference signs. Hence, duplicate descriptions are herein omitted.

<3.2. Configuration of Base Station>

Figure 15:
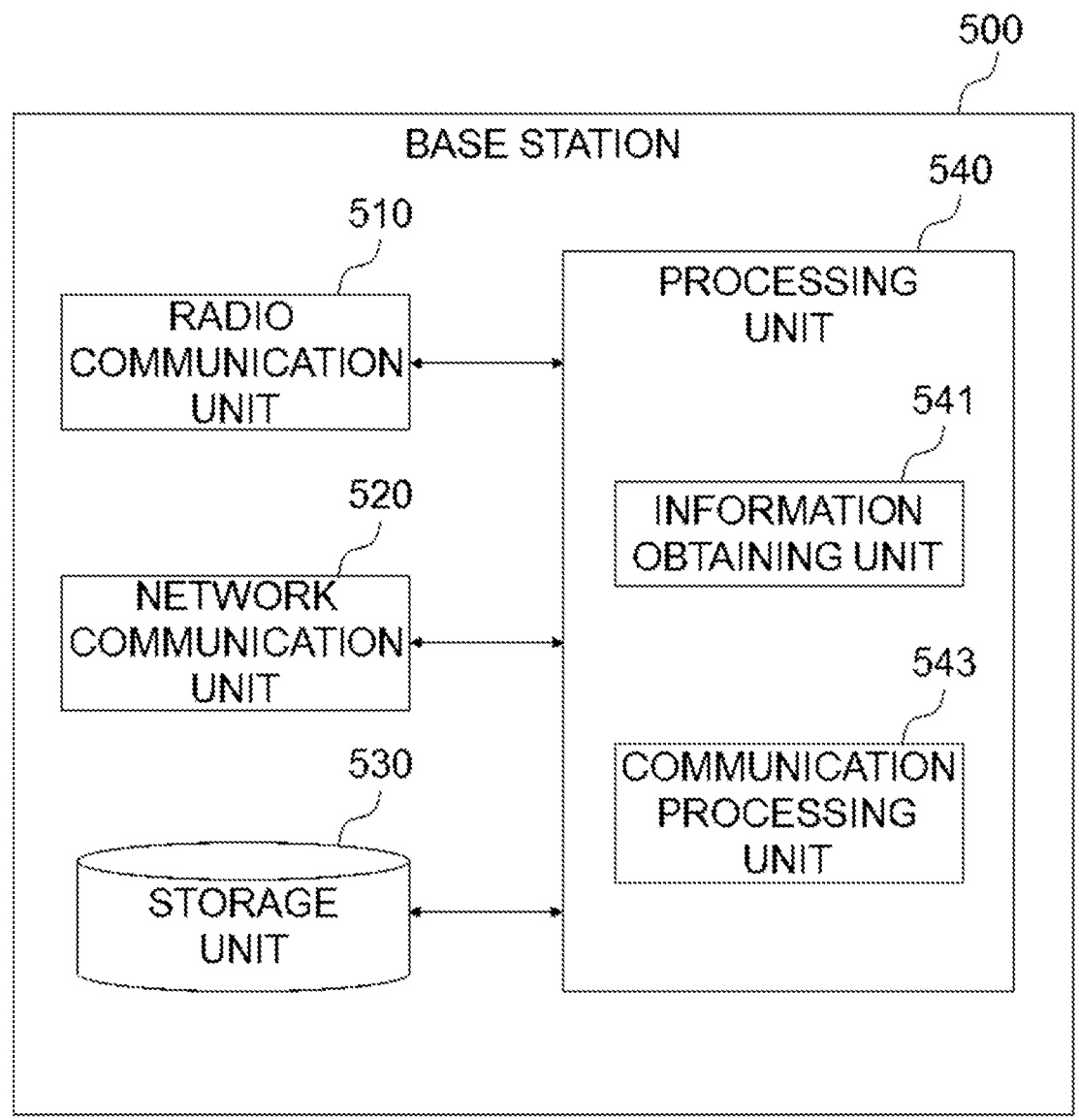
FIG. 15 is a block diagram illustrating an example of a schematic configuration of a base station of the second example embodiment.

Next, an example of a configuration of the base station 500 of the second example embodiment is described with reference to FIG. 15. FIG. 15 is a block diagram illustrating an example of a schematic configuration of the base station 500 of the second example embodiment. Referring to FIG. 15, the base station 500 includes a radio communication unit 510, a network communication unit 520, a storage unit 530 and a processing unit 540.

Descriptions herein about the radio communication unit 510, the network communication unit 520, the storage unit 530 and the processing unit 540 can be done similarly to the foregoing descriptions about the radio communication unit 110, the network communication unit 120, the storage unit 130 and the processing unit 140 of the first example embodiment in <2.2. Configuration of Base Station> except for the differences in reference signs. Hence, duplicate descriptions are herein omitted.

<3.3. Configuration of Terminal Apparatus>

Figure 16:
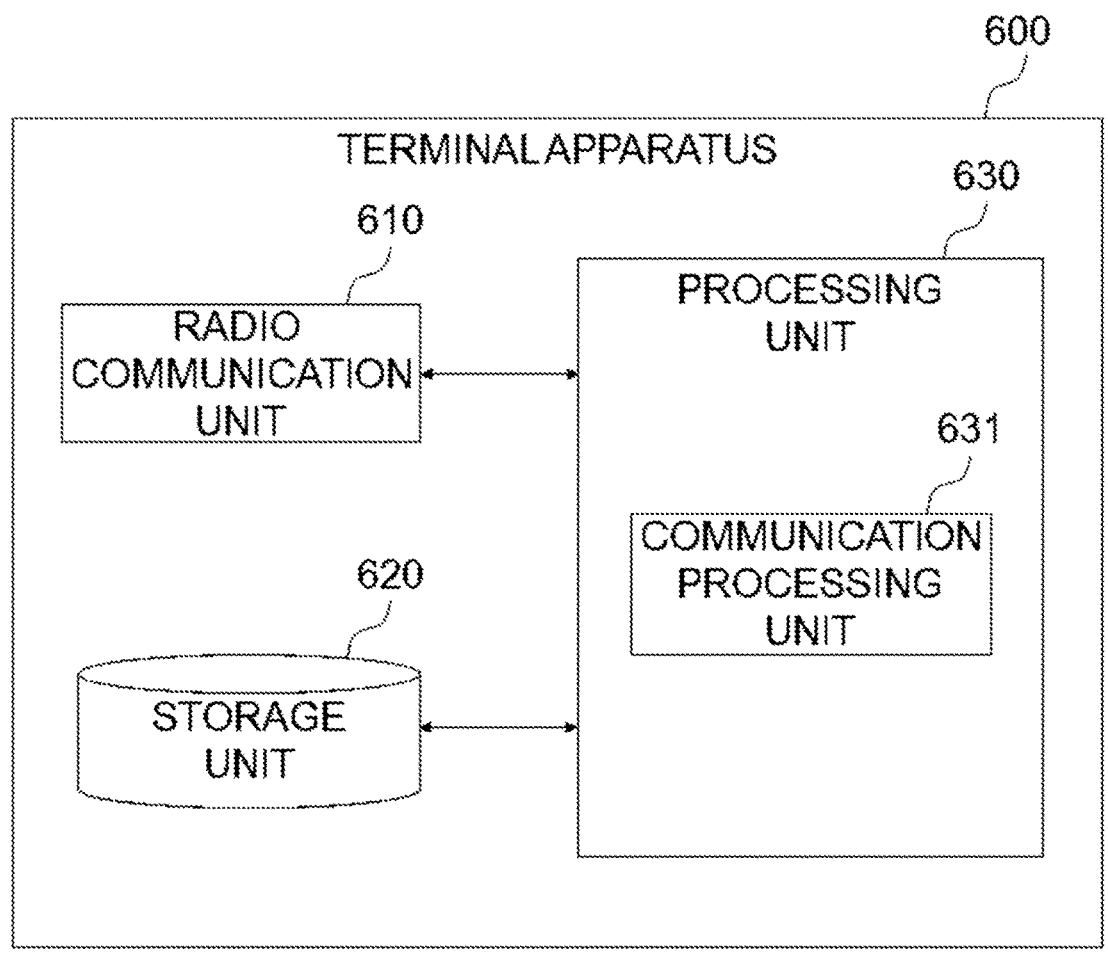
FIG. 16 is a block diagram illustrating an example of a schematic configuration of a terminal apparatus of the second example embodiment.

Next, an example of a configuration of the terminal apparatus 600 of the second example embodiment is described with reference to FIG. 16. FIG. 16 is a block diagram illustrating an example of a schematic configuration of the terminal apparatus 600 of the second example embodiment. Referring to FIG. 16, the terminal apparatus 600 includes a radio communication unit 610, a storage unit 620 and a processing unit 630.

Description herein about the radio communication unit 610, the storage unit 620 and the processing unit 630 can be done similarly to the foregoing descriptions about the radio communication unit 210, the storage unit 220 and the processing unit 230 of the first example embodiment in <2.3. Configuration of Terminal Apparatus> except for the differences in reference signs. Hence, duplicate descriptions are herein omitted.

<3.4. Technical Features>

Next, with reference to FIG. 17 to FIG. 20, technical features of the second example embodiment are described.

The base station 500 (information obtaining unit 541) obtains guard band information which indicates a guard band within a frequency band including a first band with a first subcarrier spacing and a second band with a second subcarrier spacing. Then, the base station 500 (communication processing unit 543) transmits the guard band information to the terminal apparatus 600. Note that, for example, the base station 500 (information obtaining unit 541) obtains the guard band information by generating the guard band information.

The terminal apparatus 600 (communication processing unit 631) receives the guard band information from the base station 500. Then, the terminal apparatus 600 (communication processing unit 631) performs radio communications within the frequency band on the basis of the guard band information.

Herein, the "subcarrier" is a minimum unit of frequency over which a signal can be carried and is, as an example, an OFDM subcarrier. The "subcarrier" may be simply referred to as a carrier. The "subcarrier spacing" is a spacing with which subcarriers are arranged. The "guard band" corresponds to frequencies or a band over which no signal is transmitted and, for example, includes one or more subcarriers.

(1) Frequency Band

As described above, the frequency band includes the first band with the first subcarrier spacing and the second band with the second subcarrier spacing. In other words, the frequency band is a frequency band in which different subcarrier spacings exist. For example, the first band and the second band are adjacent to each other within the frequency band. Of course, the frequency band may further include one or more other bands (for example, a third band). Each of such one or more other bands may be a band with the first subcarrier spacing or the second subcarrier spacing or a band with another subcarrier spacing.

According to the second example embodiment, for example, the first band and the second band are configured semi-statically by an operator or the network. That is, the first band and the second band will be unchanged for a long period to some extent (for example, a longer period compared to a TTI/subframe). Hereinafter, an example of the frequency band is described with reference to FIG. 17.

Figure 17:
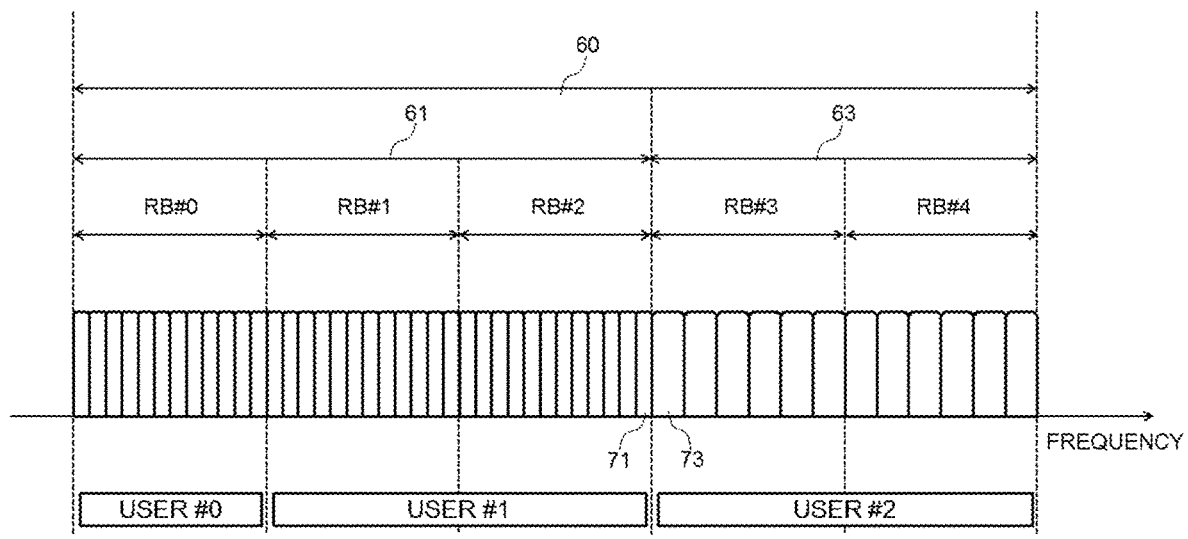
FIG. 17 is an explanatory diagram for describing an example of a frequency band of the second example embodiment.

FIG. 17 is an explanatory diagram for describing an example of a frequency band of the second example embodiment. Referring to FIG. 17, a frequency band 60 is illustrated. The frequency band 60 includes the band 61 with the subcarrier spacing of 15 kHz and the band 63 with the subcarrier spacing of 30 kHz. For example, these bands 61 and 63 are configured by an operator or the network and is fixed for a long period to some extent (for example, a longer period compared to a TTI/subframe). In this example, the frequency band 60 includes five resource blocks (RB) (RB #0 to RB #4) of which RBs #0 to #2 are included in the band 61 with the subcarrier spacing of 15 kHz whereas RBs #3 to #4 are included in the band 63 with the subcarrier spacing of 30 kHz. Thus, for example, the RB #0, the RB #1 and the RB #2 in the band 61 are assigned to a user #0 and a user #1 which use a subcarrier spacing of 15 kHz. The RB #3 and the RB #4 in the band 63 are assigned to a user #2 which uses a subcarrier spacing of 30 kHz.

In this way, it becomes possible, for example, to accommodate different services having different demands by using different subcarrier spacings within a frequency band. More specifically, for example, using a larger subcarrier spacing in frequency direction makes a symbol duration in time direction shorter, which may lead to low latency in signal transmissions. It thus allows, for example, for accommodating a service that requires low latency. For example, using a smaller subcarrier spacing in frequency direction enables a larger number of terminal apparatuses to be connected simultaneously. It thus allows for accommodating a service that requires a large number of connections with terminal apparatuses, for example.

Note that the frequency band may be a frequency band for FDD. In this case, the frequency band may be a downlink band or an uplink band. Alternatively, the frequency band may be a frequency band for TDD.

(2) Guard Band Information

Among others, in the second example embodiment, the base station 500 (information obtaining unit 541) obtains a message of a control protocol, the message including the guard band information. Then, the base station 500 (communication processing unit 543) transmits the message to the terminal apparatus 600. Note that, for example, the base station 500 (information obtaining unit 541) obtains the message by generating the message.

Message

For example, the control protocol is the Radio Resource Control (RRC) protocol and the message is an RRC message.

First Example: Signaling Message for Terminal Apparatus 600

As a first example, the message is a signaling message for the terminal apparatus 600 (that is, a dedicated message for the terminal apparatus 600). For example, the signaling message is an RRC signaling message.

Specifically, for example, the signaling message is a message in a connection procedure of the terminal apparatus 600 for the frequency band. That is, the base station 500 (communication processing unit 543) transmits the guard band information to the terminal apparatus 600 when connecting to the terminal apparatus 600. As an example, the signaling message is an RRC CONNECTION SETUP REQUEST message. That is, the guard band information is added to the RRC CONNECTION SETUP REQUEST message.

In this way, for example, it becomes possible to transmit the guard band information to the terminal apparatus 600 which connects to the base station 500 at a specific timing (for example, at the time of connection). Thus, for example, there will be no need to transmit the guard band information per subframe basis as in the first example embodiment and the required amount of radio resources for notification of the guard band information can be suppressed.

Note that the base station 500 (communication processing unit 543) may transmit such messages only to terminal apparatuses to which a radio resource including a guard band is (likely to be) allocated. That is, the base station 500 (communication processing unit 543) may transmit the message to the terminal apparatus 600 if a radio resource including a guard band is (likely to be) allocated to the terminal apparatus 600. In this way, the required amount of radio resources for notification of the guard band information can be further suppressed.

Second Example: System Information

As a second example, the message may be system information. Such system information is information broadcasted by the base station 500, which can be received by every terminal apparatus located within the cell 50 of the base station 500.

Specifically, for example, the system information is a Master Information Block (MIB). For example, the system information is transmitted within a specific subframe of a Radio Frame (RF). As an example, the system information is transmitted within the subframes #0 and #5 out of the subframes #0 to #9 (ten subframes) included in a radio frame. The system information is transmitted in a specific band within the frequency band (for example, in the RB #2 in the example of FIG. 17).

Alternatively, the system information may be a System Information Block (SIB).

In this way, for example, there will be no need to transmit the guard band information for each terminal apparatus and the required amount of radio resources for notification of the guard band information can be suppressed. In addition, the terminal apparatus 600 will be able to know about a guard band prior to being connected to the base station 500.

Guard Band

For example, the guard band indicated by the guard band information corresponds to one or more subcarriers. For example, the guard band is narrower than a Resource Block (RB) that is a unit for assigning radio resources. This makes it possible to alleviate deterioration of frequency utilization efficiency due to the guard band (compared to the case where a guard band is arranged in terms of RBs).

For example, the first band and the second band are adjacent to each other within the frequency band and the guard band includes one or more subcarriers near a boundary between the first band and the second band. More specifically, for example, such one or more subcarriers near the boundary include one or more subcarriers within the first band that are adjacent to the second band or one or more subcarriers within the second band that are adjacent to the first band. Hereinafter, an example of the guard band indicated by the guard band information is described with reference to FIG. 18.

Figure 18:
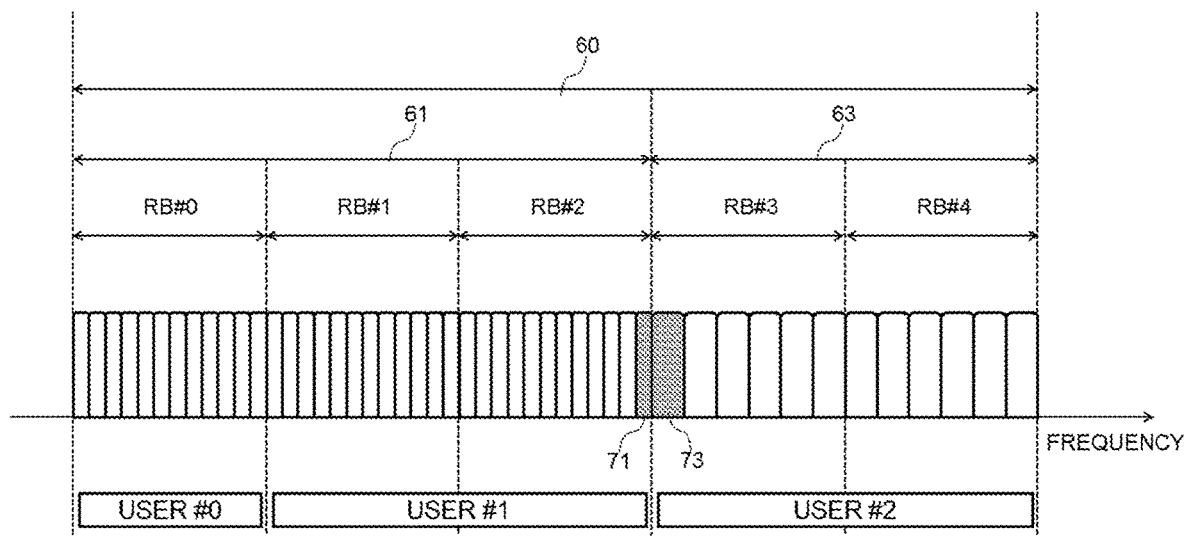
FIG. 18 is an explanatory diagram for describing an example of a guard band indicated by guard band information.

FIG. 18 is an explanatory diagram for describing an example of a guard band indicated by guard band information. Referring to FIG. 18, the frequency band 60, the band 61 and the band 63 are illustrated similarly to FIG. 17. In this example, the band 61 and the band 63 are adjacent to each other within the frequency band 60 and the guard band indicated by the guard band information corresponds to the subcarriers 71, 73.

Note that, though the example where a guard band corresponds to two subcarriers is described with reference to FIG. 18, the second example embodiment is of course not limited to this example. A guard band may correspond to one subcarrier (one subcarrier of one band; for example, one of the subcarriers 71, 73) or may correspond to three or more subcarriers.

The guard bands described above, for example, makes it possible to suppress interference between subcarriers (in particular, interference between subcarriers with different subcarrier spacings) even when there are different subcarrier spacings within a frequency band.

Guard Band Information

Boundary Information

For example, the guard band information includes boundary information which indicates a boundary between the first band and the second band.

Specifically, for example, the boundary information includes first band information indicating the first band and second band information indicating the second band. That is, the boundary information is information which indirectly indicates the boundary. For example, the first band information includes information indicative of a start position of the first band (for example, an RB subsequent to (or preceding) the start position of the first band); and information indicative of a width (for example, the number of RBs) or an end position of the first band (for example, an RB subsequent to (or preceding) the end position of the first band). The first band information may further include subcarrier spacing information indicative of the first subcarrier spacing. The content of the second band information is similar to the content of the first band information.

Alternatively, the boundary information may be information which directly indicates the boundary within the frequency band. For example, the boundary information may be information indicative of a resource block subsequent to (or preceding) the boundary (for example, an RB index) or information indicative of the boundary itself (for example, a boundary index).

Width Information

The guard band information may include width information indicative of the width of the guard band. For example, the width information may indicate the number of subcarriers included in the guard band.

Alternatively, the width of the guard band may be fixed. In this case, the guard band information may not include the width information.

As stated above, according to the second example embodiment, the above message includes the guard band information and the base station 500 transmits the message to the terminal apparatus 600. In this way, for example, there will be no need to transmit the guard band information per subframe basis as in the first example embodiment and the required amount of radio resources for notification of the guard band information can be suppressed.

(3) Radio Communications

Base Station

For example, the frequency band is a frequency band used by the base station 500. In this case, the base station 500 (communication processing unit 543) uses one or more subcarriers in the frequency band as a guard band to perform radio communications within the frequency band. The radio communication may be downlink transmission or uplink reception.

For example, the first band and the second band are adjacent to each other within the frequency band and the one or more subcarriers (guard band) includes one or more subcarriers near a boundary between the first band and the second band. More specifically, for example, such one or more subcarriers near the boundary include one or more subcarriers within the first band that are adjacent to the second band or one or more subcarriers within the second band that are adjacent to the first band.

In the example of FIG. 18, the base station 500 uses the subcarriers 71, 73 near the boundary between the band 61 and the band 63 as a guard band to perform radio communications within the frequency band 60.

This, for example, makes it possible that there exist different subcarrier spacings within a frequency band while suppressing interference between subcarriers.

Terminal Apparatus

As described above, the terminal apparatus 600 (communication processing unit 631) receives the guard band information from the base station 500 and performs radio communications within the frequency band on the basis of the guard band information.

For example, the terminal apparatus 600 (communication processing unit 631) receives a message (for example, an RRC signaling message) and obtains guard band information included in the message. Then, the terminal apparatus 600 (communication processing unit 631) identifies a guard band from the guard band information. The terminal apparatus 600 (communication processing unit 631) further receives control information (for example, DCI), obtains assignment information included in the control information and identifies a radio resource assigned to the terminal apparatus 600 from the assignment information. If there exists at least a portion of the guard band (one or more subcarriers) in the radio resource, the terminal apparatus 600 (communication processing unit 631) uses the at least a portion (one or more subcarriers) as a guard band to perform radio communications within the frequency band. The radio communication may be downlink reception or uplink transmission.

For example, the first band and the second band are adjacent to each other within the frequency band and the one or more subcarriers includes one or more subcarriers near a boundary between the first band and the second band. More specifically, for example, such one or more subcarriers near the boundary include one or more subcarriers within the first band that are adjacent to the second band or one or more subcarriers within the second band that are adjacent to the first band.

In the example of FIG. 18, as an example, the terminal apparatus 600 is the user #1 and the terminal apparatus 600 uses the subcarrier 71 near the boundary between the band 61 and the band 63 as a guard band to perform radio communications within the frequency band 60 (RB #1 and RB #2). As another example, the terminal apparatus 600 is the user #2 and the terminal apparatus 600 uses the subcarrier 73 near the boundary between the band 61 and the band 63 as a guard band to perform radio communications within the frequency band 60 (RB #3 and RB #4). Note that, when the terminal apparatus 600 is the user #0, the terminal apparatus 600 performs radio communication within the frequency band 60 (RB #0) without any guard band.

Downlink Reception

For example, the terminal apparatus 600 (communication processing unit 631) performs reception within the frequency band on the basis of the guard band information. More specifically, for example, the reception within the frequency band includes extracting a symbol from a resource element within the frequency band on the basis of the guard band information. Such extraction of a symbol may be referred to as symbol de-mapping.

In the example of FIG. 18, as an example, the terminal apparatus 600 is the user #1 and the terminal apparatus 600 extracts symbols from resource elements contained in the RB #1 and the RB #2. In this case, the terminal apparatus 600 does not extract any symbol from resource elements of the subcarrier 71 and extracts symbols from resource elements of the other subcarriers.

Uplink Transmission

The terminal apparatus 600 (communication processing unit 631) may perform transmission within the frequency band on the basis of the guard band information. More specifically, the transmission within the frequency band may include mapping a symbol to a resource element within the frequency band on the basis of the guard band information.

In the example of FIG. 18, as an example, the terminal apparatus 600 is the user #1 and the terminal apparatus 600 maps symbols to resource elements contained in the RB #1 and the RB #2. In this case, the terminal apparatus 600 does not map any symbol to resource elements of the subcarrier 71 and maps symbols to resource elements of the other subcarriers.

(4) Process Flow

Examples of processes of the second example embodiment are described with reference to FIG. 19 and FIG. 20.

Downlink

Figure 19:
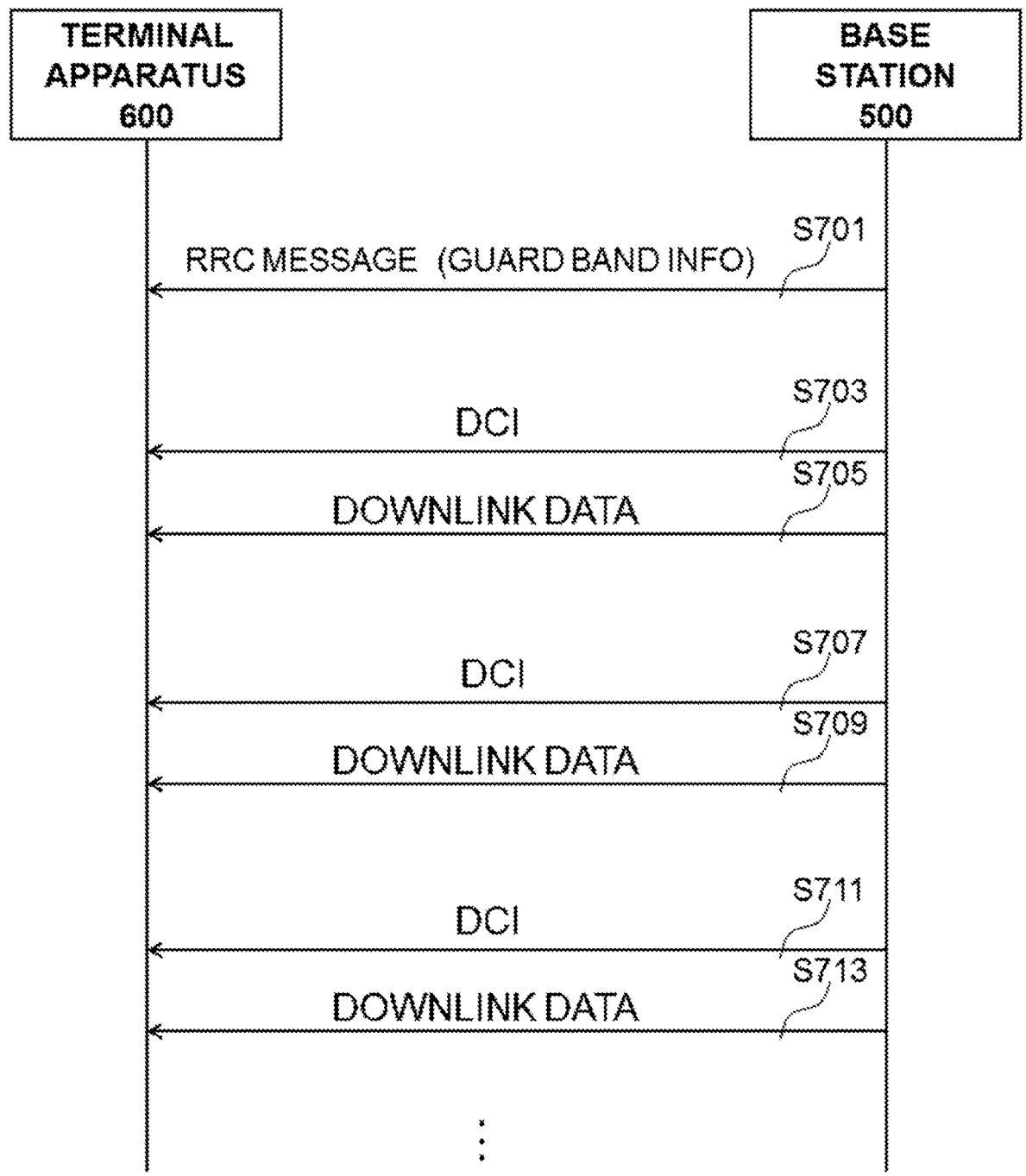
FIG. 19 is a sequence diagram for describing a first example of a schematic flow of a process of the second example embodiment.

FIG. 19 is a sequence diagram for describing a first example of a schematic flow of a process of the second example embodiment. The first example is an example where the base station 500 transmits downlink data to the terminal apparatus 600.

The base station 500 obtains an RRC message by generating it and transmits the RRC message and the terminal apparatus 600 receives the RRC message (S701). The RRC message may be an RRC signaling message for the terminal apparatus 600 or may be system information. The RRC message includes guard band information which indicates a guard band within a frequency band in which different subcarrier spacings exist. For example, the guard band information includes boundary information which indicates a boundary between bands with different subcarrier spacings.

The base station 500 transmits DCI for the terminal apparatus 600 to the terminal apparatus 600 (S703). The terminal apparatus 600 receives the DCI. The DCI includes assignment information which indicates a radio resource assigned to the terminal apparatus 600. The radio resource is a radio resource within a frequency band in which different subcarrier spacings exist. The radio resource is a downlink radio resource. The frequency band may be a downlink band of FDD. Alternatively, the frequency band may be a frequency band of TDD and the radio resource may be a radio resource in a downlink subframe.

Further, the base station 500 transmits downlink data to the terminal apparatus 600 in the radio resource (S705). The terminal apparatus 600 receives the downlink data in the radio resource indicated by the assignment information.

For example, the radio resource is adjacent to a boundary between bands with different subcarrier spacings. In this case, the base station 500 uses one or more subcarriers near the boundary as a guard band to transmit the downlink data in the radio resource. Correspondingly, the terminal apparatus 600 uses the one or more subcarriers near the boundary as the guard band to receive the downlink data in the radio resource.

Alternatively, the radio resource is not adjacent to such a boundary. In this case, the base station 500 transmits the downlink data in the radio resource without any guard band. The terminal apparatus 600 receives the downlink data in the radio resource without any guard band.

Similar actions to steps S703 and S705 are also performed at steps S707, S709 and steps S711, S713.

Uplink

Figure 20:
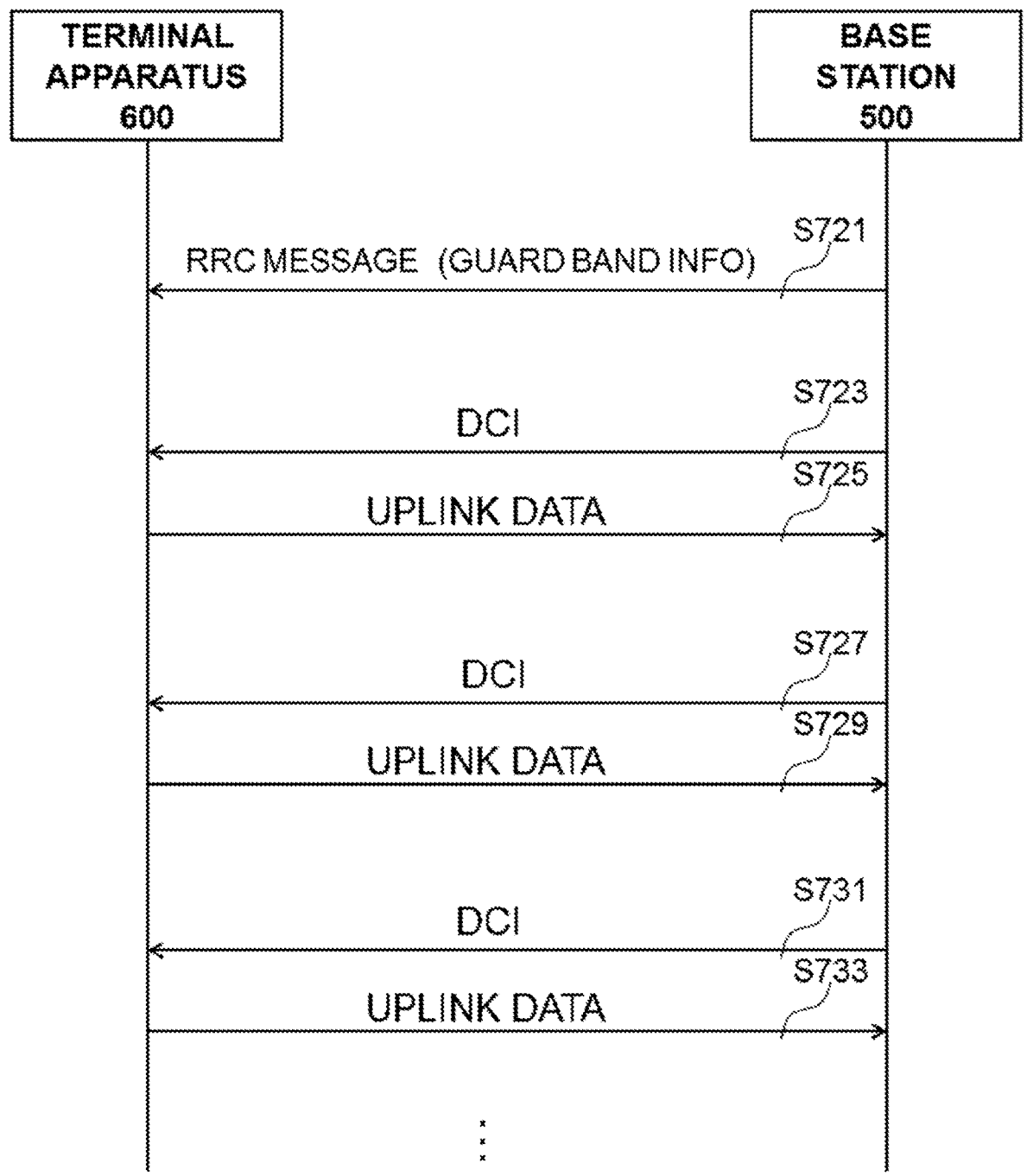
FIG. 20 is a sequence diagram for describing a second example of a schematic flow of a process of the second example embodiment.

FIG. 20 is a sequence diagram for describing a second example of a schematic flow of a process of the second example embodiment. The second example is an example where the terminal apparatus 600 transmits uplink data to the base station 500.

The base station 500 obtains an RRC message by generating it and transmits the RRC message and the terminal apparatus 600 receives the RRC message (S721). The RRC message may be an RRC signaling message for the terminal apparatus 600 or may be system information. The RRC message includes guard band information which indicates a guard band within a frequency band in which different subcarrier spacings exist. For example, the guard band information includes boundary information which indicates a boundary between bands with different subcarrier spacings.

The base station 500 transmits DCI for the terminal apparatus 600 to the terminal apparatus 600 (S723). The terminal apparatus 600 receives the DCI. The DCI includes assignment information which indicates a radio resource assigned to the terminal apparatus 600. The radio resource is a radio resource within a frequency band in which different subcarrier spacings exist. The radio resource is an uplink radio resource. The frequency band may be an uplink band of FDD. Alternatively, the frequency band may be a frequency band of TDD and the radio resource may be a radio resource in an uplink subframe.

Further, the terminal apparatus 600 transmits uplink data in the radio resource (S725). The base station 500 receives the uplink data in the radio resource.

For example, the radio resource is adjacent to a boundary between bands with different subcarrier spacings. In this case, the terminal apparatus 600 uses one or more subcarriers near the boundary as a guard band to transmit the uplink data in the radio resource. Correspondingly, the base station 500 uses the one or more subcarriers near the boundary as the guard band to receive the uplink data in the radio resource.

Alternatively, the radio resource is not adjacent to such a boundary. In this case, the terminal apparatus 600 transmits the uplink data in the radio resource without any guard band. The base station 500 receives the uplink data in the radio resource without any guard band.

Similar actions to steps S723 and S725 are also performed at steps S727, S729 and steps S731, S733.

(5) Meanings of "Transmission"/"Reception"/"Radio Communications"

The same descriptions about "transmit"/"perform transmission", "receive"/"perform reception" and "perform radio communications" as those in the first example embodiment apply here. Hence, duplicate descriptions are herein omitted.

<3.5. Example Alterations>

Next, with reference to FIG. 21 to FIG. 24, example alterations of the second example embodiment are described.

In the example of the second example embodiment, the frequency band is a frequency band that is used by the base station 500. That is, the base station 500 performs radio communications within the frequency band.

Meanwhile, in an example alteration of the second example embodiment, the frequency band is used by another base station which is different than the base station 500. That is, the base station 500 transmits control information for the frequency band and another base station performs radio communications within the frequency band.

(1) Configuration of System

Figure 21:
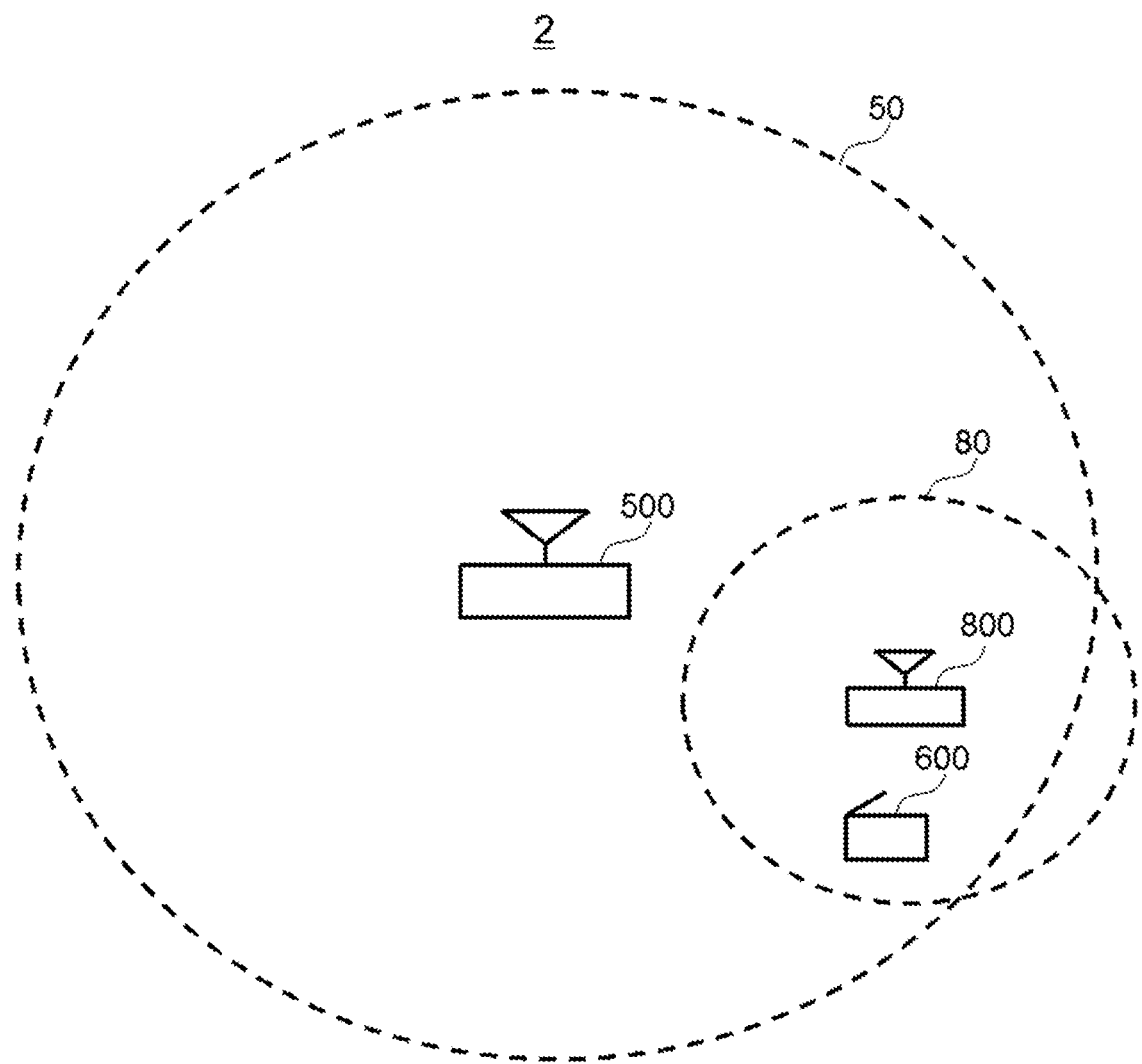
FIG. 21 is an explanatory diagram illustrating an example of a schematic configuration of a system of an example alteration of the second example embodiment.

FIG. 21 is an explanatory diagram illustrating an example of a schematic configuration of a system 2 of an example alteration of the second example embodiment. Referring to FIG. 21, in the example alteration, the system 2 further includes the base station 800 in addition to the base station 500 and the terminal apparatus 600.

Descriptions herein about the system 2, the base station 500, the terminal apparatus 600 and the base station 800 can be done similarly to the foregoing descriptions about the system 1, the base station 100, the terminal apparatus 200 and the base station 400 of the example alteration of the first example embodiment in the (1) Configuration of System of <2.5. Example Alteration> except for the differences in reference signs. Hence, duplicate descriptions are herein omitted.

(2) Configuration of Base Station 800

Figure 22:
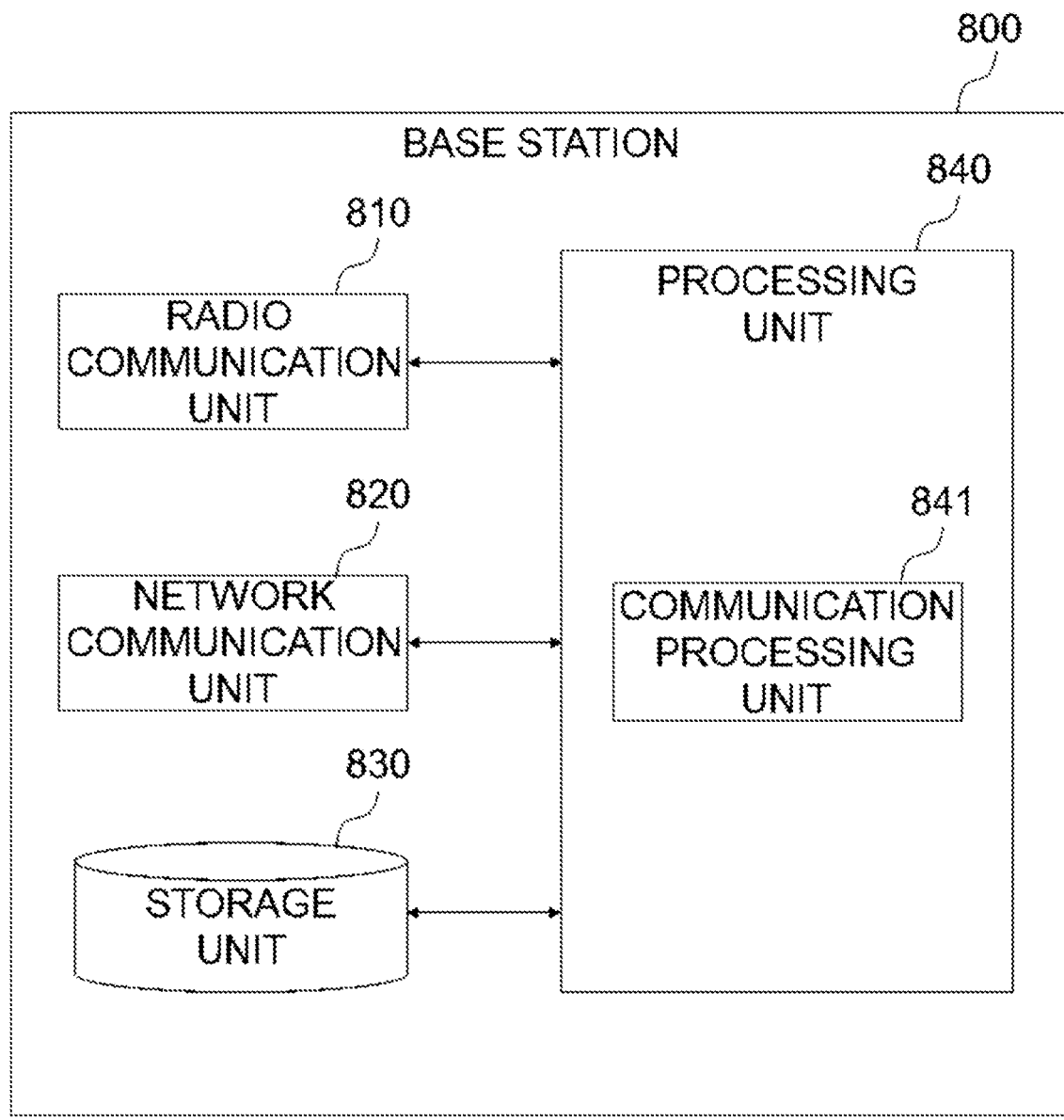
FIG. 22 is a block diagram illustrating an example of a schematic configuration of a base station of the example alteration of the second example embodiment.

FIG. 22 is a block diagram illustrating an example of a schematic configuration of the base station 800 of the example alteration of the second example embodiment. Referring to FIG. 22, the base station 800 includes a radio communication unit 810, a network communication unit 820, a storage unit 830 and a processing unit 840.

Descriptions herein about the radio communication unit 810, the network communication unit 820, the storage unit 830 and the processing unit 840 can be done similarly to the foregoing descriptions about the radio communication unit 410, the network communication unit 420, the storage unit 430 and the processing unit 440 of the example alteration of the first example embodiment in the (2) Configuration of Base Station 400 of <2.5. Example Alteration> except for the differences in reference signs. Hence, duplicate descriptions are herein omitted.

(3) Technical Features (Radio Communications)

Among others, in the example alterations, the frequency band (that is, the frequency band in which different subcarrier spacings exist) is a frequency band that is not used by the base station 500 but used by the base station 800. That is, not the base station 500 but the base station 800 (communication processing unit 841) uses one or more subcarrier spacings in the frequency band as a guard band to perform radio communications within the frequency band. The radio communication may be downlink transmission or uplink reception.

In the example of FIG. 18, the base station 800 uses the subcarriers 71, 73 near the boundary between the band 61 and the band 63 as a guard band to perform radio communications within the frequency band 60.

(4) Technical Features (Process Flow)

Examples of processes of the example alteration of the second example embodiment are described with reference to FIG. 23 and FIG. 24.

Downlink

Figure 23:
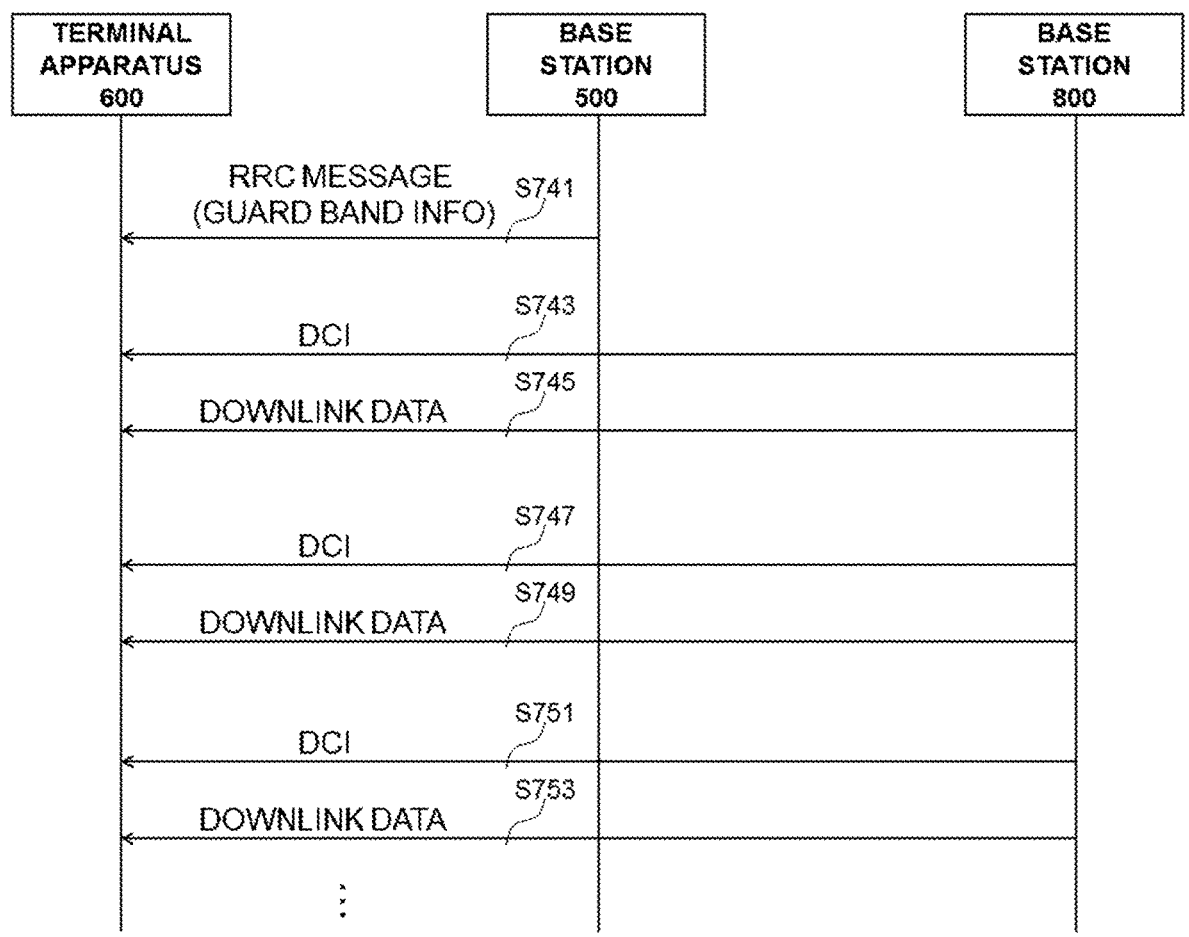
FIG. 23 is a sequence diagram for describing a first example of a schematic flow of a process of the example alteration of the second example embodiment.

FIG. 23 is a sequence diagram for describing a first example of a schematic flow of a process of the example alteration of the second example embodiment. The first example is an example where the base station 800 transmits downlink data to the terminal apparatus 600.

Descriptions about the step S741 can be done similarly to the descriptions about the step S701 in the example of FIG. 19. Hence, duplicate descriptions are herein omitted.

The base station 800 transmits DCI for the terminal apparatus 600 to the terminal apparatus 600 (S743). The terminal apparatus 600 receives the DCI. Further, the base station 800 transmits downlink data to the terminal apparatus 600 in a radio resource assigned to the terminal apparatus 600 (S745). The terminal apparatus 600 receives the downlink data in the radio resource indicated by the assignment information.

Descriptions about these steps S743, S745 can be done similarly to the descriptions about the steps S703, S705 in the example of FIG. 19 except for the differences in which entity performs the actions (that is, not the base station 500 but the base station 800 transmits DCI and downlink data). Hence, duplicate descriptions are herein omitted.

Similar actions to steps S743 and S745 are also performed at steps S747, S749 and steps S751, S753.

Note that, similarly to the example of FIG. 19, the transmissions of DCI at steps S743, S747, S751 may be performed by the base station 500 instead of the base station 800.

Uplink

Figure 24:
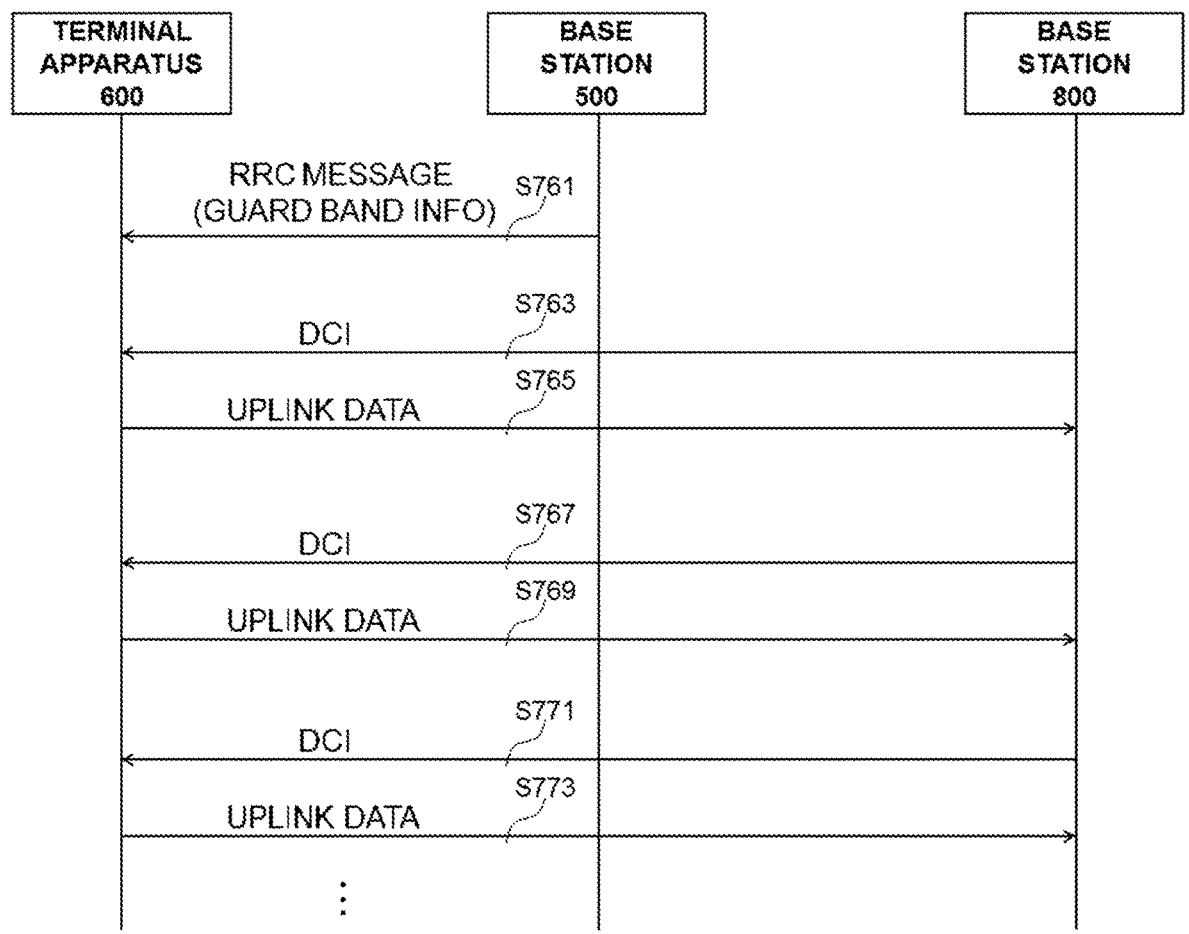
FIG. 24 is a sequence diagram for describing a second example of a schematic flow of a process of the example alteration of the second example embodiment.

FIG. 24 is a sequence diagram for describing a second example of a schematic flow of a process of the example alteration of the second example embodiment. The second example is an example where the terminal apparatus 600 transmits uplink data to the base station 800.

Descriptions about the step S761 can be done similarly to the descriptions about the step S721 in the example of FIG. 20. Hence, duplicate descriptions are herein omitted.

The base station 800 transmits DCI for the terminal apparatus 600 to the terminal apparatus 600 (S763). The terminal apparatus 600 receives the DCI. Further, the terminal apparatus 600 transmits an uplink data in a radio resource assigned to the terminal apparatus 600 (S765). The base station 800 receives the uplink data in the radio resource.

Descriptions about these steps S763, S765 can be done similarly to the descriptions about the steps S723, S725 in the example of FIG. 20 except for the differences in which entity performs the actions (that is, not the base station 500 but the base station 800 transmits DCI and receives uplink data). Hence, duplicate descriptions are herein omitted.

Similar actions to steps S763 and S765 are also performed at steps S767, S769 and steps S771, S773.

Note that, similarly to the example of FIG. 20, the transmissions of DCI at steps S763, S767, S771 may be performed by the base station 500 instead of the base station 800.

(5) Others

In an example alteration, for example, the guard band information is generated (or saved) by the base station 800 and transmitted from the base station 800 to the base station 500.

As another example, the guard band information may be generated (or saved) by the base station 500 and transmitted from the base station 500 to the base station 800.

As yet another example, the guard band information may be saved (or generated) by another node (for example, a core network node or the like) and transmitted to the base station 500 and the base station 800.

4. Third Example Embodiment

Next, a third example embodiment of the present invention will be described with reference to FIG. 25 to FIG. 28. The foregoing first and second example embodiments are concrete embodiments whereas the third example embodiment is a more generalized embodiment.

<4.1. Configuration of System

Figure 25:
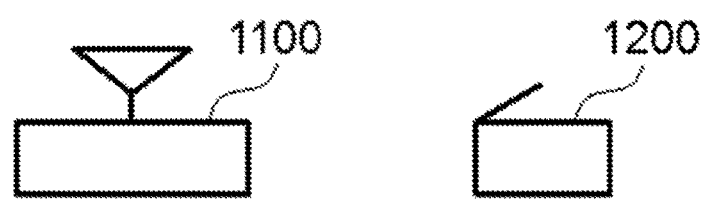
FIG. 25 is an explanatory diagram illustrating an example of a schematic configuration of a system of a third example embodiment.

An example of a configuration of a system 3 of the third example embodiment is described with reference to FIG. 25. FIG. 25 is an explanatory diagram illustrating an example of a schematic configuration of the system 3 of the third example embodiment. Referring to FIG. 25, the system 3 includes a base station 1100 and a terminal apparatus 1200.

For example, descriptions herein about the system 3, the base station 1100 and the terminal apparatus 1200 can be done similarly to the foregoing descriptions about the system 1, the base station 100 and the terminal apparatus 200 of the first example embodiment in <2.1. Configuration of System> except for the differences in reference signs. Hence, duplicate descriptions are herein omitted.

<4.2. Configuration of Base Station>

Figure 26:
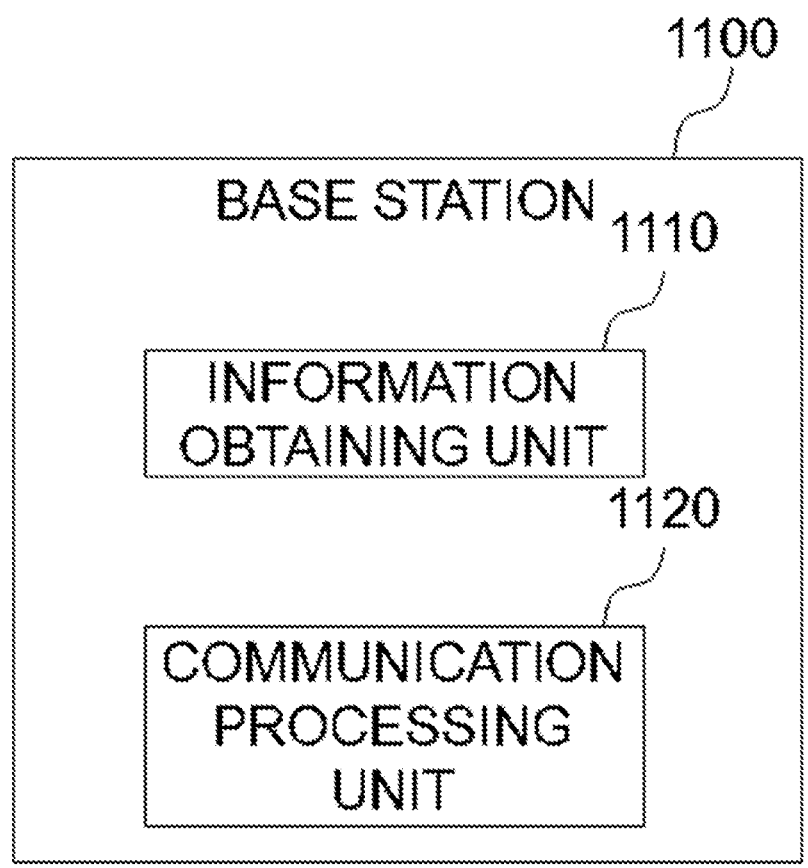
FIG. 26 is a block diagram illustrating an example of a schematic configuration of a base station of the third example embodiment.

Next, an example of a configuration of the base station 1100 of the third example embodiment is described with reference to FIG. 26. FIG. 26 is a block diagram illustrating an example of a schematic configuration of the base station 1100 of the third example embodiment. Referring to FIG. 26, the base station 1100 includes an information obtaining unit 1110 and a communication processing unit 1120.

Concrete operations of the information obtaining unit 1110 and the communication processing unit 1120 will be described later.

The information obtaining unit 1110 and the communication processing unit 1120 may be implemented with a Base Band (BB) processor, another processor and/or the like. The information obtaining unit 1110 and the communication processing unit 1120 may be implemented with the same processor or with respective different processors.

The base station 1100 may include a memory that stores programs and one or more processors that are capable of executing the programs and the one or more processors may execute the operations of the information obtaining unit 1110 and the communication processing unit 1120. The programs may be programs for causing the one or more processors to execute the operations of the information obtaining unit 1110 and the communication processing unit 1120.

<4.3. Configuration of Terminal Apparatus>

Figure 27:
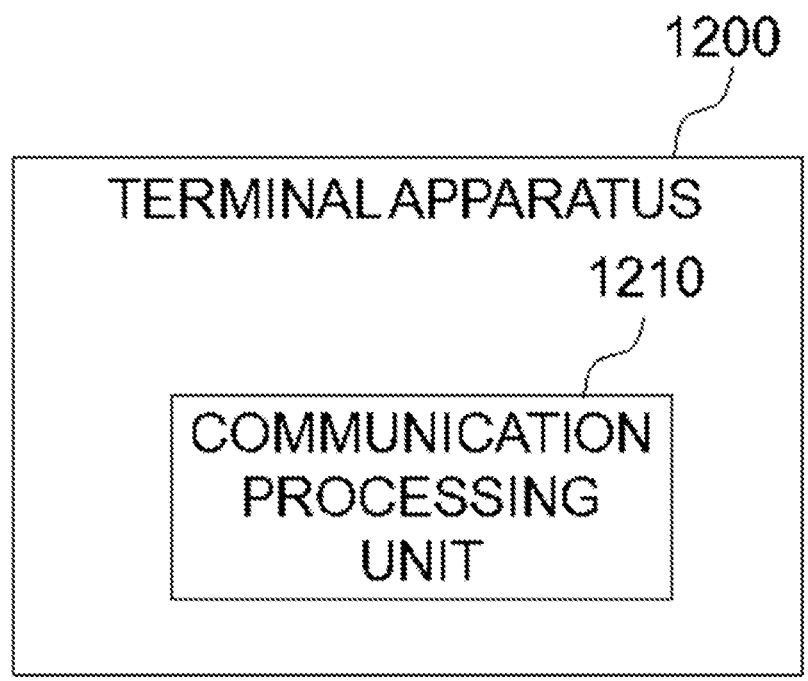
FIG. 27 is a block diagram illustrating an example of a schematic configuration of a terminal apparatus of the third example embodiment.

Next, an example of a configuration of the terminal apparatus 1200 of the third example embodiment is described with reference to FIG. 27. FIG. 27 is a block diagram illustrating an example of a schematic configuration of the terminal apparatus 1200 of the third example embodiment. Referring to FIG. 27, the terminal apparatus 1200 includes a communication processing unit 1210.

Concrete operations of the communication processing unit 1210 will be described later.

The communication processing unit 1210 may be implemented with a Base Band (BB) processor, another processor and/or the like.

The terminal apparatus 1200 may include a memory that stores programs and one or more processors that are capable of executing the programs and the one or more processors may execute the operations of the communication processing unit 1210. The programs may be programs for causing the one or more processors to execute the operations of the communication processing unit 1210.

<4.4. Technical Features>

The base station 1100 (information obtaining unit 1110) obtains guard band information which indicates a guard band within a frequency band including a first band with a first subcarrier spacing and a second band with a second subcarrier spacing. Then, the base station 1100 (communication processing unit 1120) transmits the guard band information to the terminal apparatus 1200.

The terminal apparatus 1200 (communication processing unit 1210) receives the guard band information from the base station 1100. Then, the terminal apparatus 1200 (communication processing unit 1210) performs radio communications within the frequency band on the basis of the guard band information.

Herein, the "subcarrier" is a minimum unit of frequency over which a signal can be carried and is, as an example, an OFDM subcarrier. The "subcarrier" may be simply referred to as a carrier. The "subcarrier spacing" is a spacing with which subcarriers are arranged. The "guard band" corresponds to frequencies or a band over which no signal is transmitted and, for example, includes one or more subcarriers.

(1) Meanings of Frequency Band, Guard Band Information, Radio Communications, "Transmission"/"Reception"/ "Radio Communications"

For example, the same descriptions about frequency band, guard band information, radio communications and "transmission"/"reception"/"radio communications" as the descriptions about them in the first and second example embodiments apply to the third example embodiment. Hence, duplicate descriptions are herein omitted and only an example of a schematic flow of process is described.

(4) Process Flow

Figure 28:
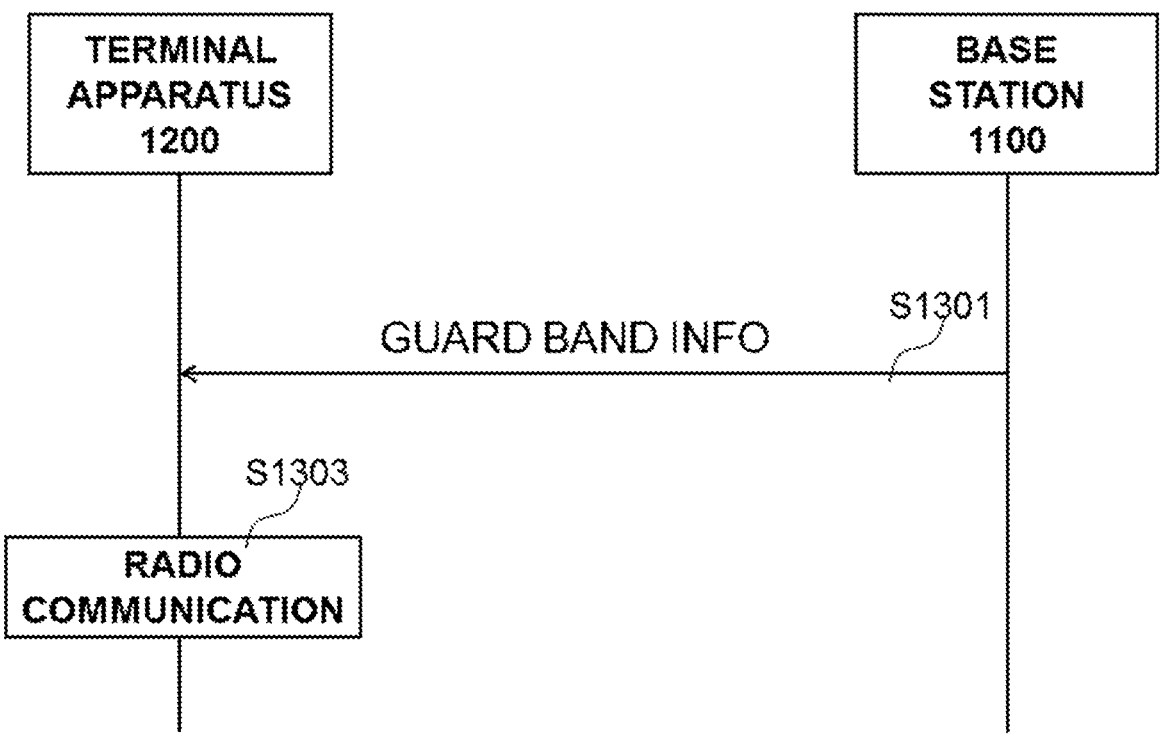
FIG. 28 is a sequence diagram for describing an example of a schematic flow of a process of the third example embodiment.

FIG. 28 is a sequence diagram for describing an example of a schematic flow of a process of the third example embodiment.

The base station 1100 obtains guard band information which indicates a guard band within a frequency band including a first band with a first subcarrier spacing and a second band with a second subcarrier spacing. Then, the base station 1100 transmits the guard band information to the terminal apparatus 1200 and the terminal apparatus 1200 receives the guard band information (S1301).

The terminal apparatus 1200 performs radio communications within the frequency band on the basis of the guard band information (S1303).

Though example embodiments have been described herein, the present invention is not limited to the above-described example embodiments. It will be understood by those of ordinary skill in the art that the above-described example embodiments are illustrative only and that various alterations can be done without departing from the scope and spirit of the present invention.

For example, the steps in processes described in the present specification may not necessarily be performed chronologically in the order illustrated in the sequence diagrams. For example, steps in a process may be performed in a different order than the order illustrated in a sequence diagram or may be performed in parallel. Some of steps in a process may be removed or further steps may be added to a process.

Moreover, an apparatus or a module (for example, a base band processor or another chip) including constituent elements of the base station described in the present specification (e.g., the information obtaining unit, and/or the communication processing unit) may be provided. Likewise, a module (for example, a base band processor or another chip) including constituent elements of the terminal apparatus described in the present specification (e.g., the communication processing unit) may be provided. In addition, methods including processes of such constituent elements may be provided, and programs for causing processors to execute processes of such constituent elements may be provided. Furthermore, recording media (computer-readable non-transitory recording media) having recorded thereon such programs may be provided. It is apparent that such apparatuses, modules, methods, programs and recording media are also included in the present invention.

Some or all of the above-described example embodiments can be described as in the following Supplementary Notes, but are not limited to the following.

(Supplementary Note 1)

An apparatus comprising:

an information obtaining unit configured to obtain guard band information which indicates a guard band within a frequency band including a first band with a first subcarrier spacing and a second band with a second subcarrier spacing; and a communication processing unit configured to transmit the guard band information to a terminal apparatus.

(Supplementary Note 2)

The apparatus according to Supplementary Note 1, wherein the guard band is narrower than a resource block that is a unit for assigning radio resources.

(Supplementary Note 3)

The apparatus according to Supplementary Note 1 or 2, wherein the guard band corresponds to one or more subcarriers.

(Supplementary Note 4)

The apparatus according to any one of Supplementary Notes 1 to 3, wherein the information obtaining unit is configured to obtain control information for notification of a radio resource that is assigned to the terminal apparatus;

the control information includes the guard band information; and the communication processing unit is configured to transmit the control information to the terminal apparatus.

(Supplementary Note 5)

The apparatus according to Supplementary Note 4, wherein the guard band is a guard band within the radio resource.

(Supplementary Note 6)

The apparatus according to Supplementary Note 5, wherein the guard band is a guard band located at a frequency edge of the radio resource.

(Supplementary Note 7)

The apparatus according to Supplementary Note 6, wherein, when the radio resource is adjacent to another radio resource with a subcarrier spacing that is different than the radio resource, the guard band corresponds to one or more subcarriers adjacent to said another radio resource and, when the radio resource is not adjacent to said another radio resource, the guard band does not exist.

(Supplementary Note 8)

The apparatus according to any one of Supplementary Notes 5 to 7, wherein the guard band information indicates presence or absence of the guard band.

(Supplementary Note 9)

The apparatus according to Supplementary Note 8, wherein the guard band information indicates that there is a guard band at a first frequency edge of the radio resource, that there is a guard band at a second frequency edge of the radio resource, that there are guard bands at both frequency edges of the radio resource, or that there is no guard band at both frequency edges of the radio resource.

(Supplementary Note 10)

The apparatus according to any one of Supplementary Notes 4 to 9, wherein a subcarrier spacing of the radio resource is a spacing determined on the basis of a subcarrier spacing for the terminal apparatus.

(Supplementary Note 11)

The apparatus according to any one of Supplementary Notes 4 to 9, wherein the control information includes subcarrier spacing information indicating a subcarrier spacing of the radio resource.

(Supplementary Note 12)

The apparatus according to any one of Supplementary Notes 1 to 3, wherein the information obtaining unit is configured to obtain a message of a control protocol;

the message includes the guard band information; and the communication processing unit is configured to transmit the message to the terminal apparatus.

(Supplementary Note 13)

The apparatus according to Supplementary Note 12, wherein the message is a Radio Resource Control (RRC) message.

(Supplementary Note 14)

The apparatus according to Supplementary Note 12 or 13, wherein the message is a signaling message for the terminal apparatus.

(Supplementary Note 15)

The apparatus according to Supplementary Note 14, wherein the signaling message is a message in a connection procedure of the terminal apparatus for the frequency band.

(Supplementary Note 16)

The apparatus according to Supplementary Note 12 or 13, wherein the message corresponds to system information.

(Supplementary Note 17)

The apparatus according to Supplementary Note 16, wherein the system information is a master information block.

(Supplementary Note 18)

The apparatus according to any one of Supplementary Notes 12 to 17, wherein the first band and the second band are adjacent to each other within the frequency band; and the guard band includes one or more subcarriers near a boundary between the first band and the second band.

(Supplementary Note 19)

The apparatus according to Supplementary Note 18, wherein the one or more subcarriers near the boundary include one or more subcarriers within the first band that are adjacent to the second band or one or more subcarriers within the second band that are adjacent to the first band.

(Supplementary Note 20)

The apparatus according to any one of Supplementary Note 18 or 19, wherein the guard band information includes boundary information indicating the boundary.

(Supplementary Note 21)

The apparatus according to Supplementary Note 20, wherein the boundary information includes first band information indicating the first band and second band information indicating the second band.

(Supplementary Note 22)

The apparatus according to any one of Supplementary Notes 1 to 21, wherein the guard band information includes width information indicating a width of the guard band.

(Supplementary Note 23)

The apparatus according to any one of Supplementary Notes 1 to 22, wherein the communication processing unit is configured to use one or more subcarriers within the frequency band as a guard band to perform radio communications within the frequency band.

(Supplementary Note 24)

The apparatus according to Supplementary Note 23, wherein the first band and the second band are adjacent to each other within the frequency band; and the one or more subcarriers include one or more subcarriers near a boundary between the first band and the second band.

(Supplementary Note 25)

The apparatus according to any one of Supplementary Notes 1 to 22, wherein the apparatus is a base station, one or more apparatuses of a plurality of apparatuses comprised in the base station or a module for one of the plurality of apparatuses; and the frequency band is a frequency band used by another base station.

(Supplementary Note 26)

The apparatus according to any one of Supplementary Notes 1 to 25, wherein the apparatus is a base station, one or more apparatuses of a plurality of apparatuses comprised in a base station or a module for one of the plurality of apparatuses.

(Supplementary Note 27)

An apparatus comprising:

a communication processing unit configured to receive guard band information from a base station, the guard band information indicating a guard band within a frequency band including a first band with a first subcarrier spacing and a second band with a second subcarrier spacing;

wherein the communication processing unit is configured to perform radio communications within the frequency band on the basis of the guard band information.

(Supplementary Note 28)

The apparatus according to Supplementary Note 27, wherein the communication processing unit is configured to perform reception within the frequency band on the basis of the guard band information, wherein the reception within the frequency band includes extracting a symbol from a resource element within the frequency band on the basis of the guard band information.

(Supplementary Note 29)

The apparatus according to Supplementary Note 27, wherein the communication processing unit is configured to perform transmission within the frequency band on the basis of the guard band information, wherein the transmission within the frequency band includes mapping a symbol to a resource element within the frequency band on the basis of the guard band information.

(Supplementary Note 30)

An apparatus comprising a communication processing unit configured to use one or more subcarriers as a guard band to perform radio communications within a frequency band, the one or more subcarriers being within the frequency band which includes a first band with a first subcarrier spacing and a second band with a second subcarrier spacing.

(Supplementary Note 31)

The apparatus according to Supplementary Note 30, wherein the first band and the second band are adjacent to each other within the frequency band; and the one or more subcarriers include one or more subcarriers near a boundary between the first band and the second band.

(Supplementary Note 32)

The apparatus according to Supplementary Note 30 or 31, wherein the apparatus is a base station, one or more apparatuses of a plurality of apparatuses comprised in a base station or a module for one of the plurality of apparatuses or a terminal apparatus or a module for terminal apparatus.

(Supplementary Note 33)

A method comprising:

obtaining guard band information which indicates a guard band within a frequency band including a first band with a first subcarrier spacing and a second band with a second subcarrier spacing; and transmitting the guard band information to a terminal apparatus.

(Supplementary Note 34)

A method comprising:

receiving guard band information from a base station, the guard band information indicating a guard band within a frequency band including a first band with a first subcarrier spacing and a second band with a second subcarrier spacing; and performing radio communications within the frequency band on the basis of the guard band information.

(Supplementary Note 35)

A method comprising using one or more subcarriers as a guard band to perform radio communications within a frequency band, the one or more subcarriers being within the frequency band which includes a first band with a first subcarrier spacing and a second band with a second subcarrier spacing.

(Supplementary Note 36)

A system comprising a base station; and a terminal apparatus;

wherein the base station is configured to transmit guard band information to the terminal apparatus, the guard band information indicating a guard band within a frequency band including a first band with a first subcarrier spacing and a second band with a second subcarrier spacing; and the terminal apparatus is configured to perform radio communications within the frequency band on the basis of the guard band information.

(Supplementary Note 37)

A program for causing a processor to execute:

obtaining guard band information which indicates a guard band within a frequency band including a first band with a first subcarrier spacing and a second band with a second subcarrier spacing; and transmitting the guard band information to a terminal apparatus.

(Supplementary Note 38)

A program for causing a processor to execute:

receiving guard band information from a base station, the guard band information indicating a guard band within a frequency band including a first band with a first subcarrier spacing and a second band with a second subcarrier spacing; and performing radio communications within the frequency band on the basis of the guard band information.

(Supplementary Note 39)

A program for causing a processor to execute: using one or more subcarriers as a guard band to perform radio communications within a frequency band, the one or more subcarriers being within the frequency band which includes a first band with a first subcarrier spacing and a second band with a second subcarrier spacing.

(Supplementary Note 40)

A computer-readable non-transitory recording medium having recorded thereon a program for causing a processor to execute:

obtaining guard band information which indicates a guard band within a frequency band including a first band with a first subcarrier spacing and a second band with a second subcarrier spacing; and transmitting the guard band information to a terminal apparatus.

(Supplementary Note 41)

A computer-readable non-transitory recording medium having recorded thereon a program for causing a processor to execute:

receiving guard band information from a base station, the guard band information indicating a guard band within a frequency band including a first band with a first subcarrier spacing and a second band with a second subcarrier spacing; and performing radio communications within the frequency band on the basis of the guard band information.

(Supplementary Note 42)

A computer-readable non-transitory recording medium having recorded thereon a program for causing a processor to execute: using one or more subcarriers as a guard band to perform radio communications within a frequency band, the one or more subcarriers being within the frequency band which includes a first band with a first subcarrier spacing and a second band with a second subcarrier spacing.

This application claims priority based on Japanese Patent Application No. 2016-149786 filed on Jul. 29, 2016, the entire disclosure of which is incorporated herein.

INDUSTRIAL APPLICABILITY

In mobile communications systems, it will be possible to accommodate different services having different demands while suppressing interference.

REFERENCE SIGNS LIST 1, 2, 3 System
10, 40, 50, 80 Cell/Coverage
20, 60 Frequency Band
21, 23, 25, 27, 61, 63 Band
31, 33, 35, 37, 71, 73 Subcarrier
100, 400, 500, 800, 1100 Base Station
141, 541, 1110 Information Obtaining Unit
143, 441, 543, 841, 1120 Communication Processing Unit
200, 600, 1200 Terminal Apparatus
231, 631, 1210 Communication Processing Unit

What is claimed is:

1. A first base station comprising:
a memory storing instructions; and
one or more processors configured to execute the instructions to:
transmit guard band information, to a User Equipment (UE), in a message related to establishing a Radio Resource Control (RRC) connection,
wherein, the guard band information comprises a value indicating a width of the guard band,
wherein the value is represented by plurality bits, and
wherein, if the value is 0, then the guard band information indicates absence of a guard band.

2. The first base station according to claim 1, wherein the guard band is narrower than a resource block that is a unit for assigning radio resources.

3. The first base station according to claim 1, wherein the guard band corresponds to one or more subcarriers.

4. The first base station according to claim 1, wherein the one or more processors are configured to execute the instructions to:
obtain control information for notification of a radio resource that is assigned to the UE, the control information including the guard band information; and
transmit the control information to the UE.

5. The first base station according to claim 4, wherein, if the radio resource is adjacent to another radio resource with a subcarrier spacing that is different than the radio resource, the guard band corresponds to one or more subcarriers adjacent to said another radio resource and, if the radio resource is not adjacent to said another radio resource, the guard band does not exist.

6. The first base station according to claim 5, wherein the guard band information indicates that there is a guard band at a first frequency edge of the radio resource, that there is a guard band at a second frequency edge of the radio resource, that there are guard bands at both frequency edges of the radio resource, or that there is no guard band at both frequency edges of the radio resource.

7. The first base station according to claim 1, wherein a first band and a second band are adjacent to each other within a frequency band; and
wherein the guard band includes one or more subcarriers near a boundary between the first band and the second band.

8. The first base station according to claim 7, wherein the one or more subcarriers near the boundary include one or more subcarriers within the first band that are adjacent to the second band or one or more subcarriers within the second band that are adjacent to the first band.

9. The first base station according to claim 7, wherein the guard band information includes boundary information indicating the boundary.

10. The first base station according to claim 9, wherein the boundary information includes first band information indicating the first band and second band information indicating the second band.

11. The first base station according to claim 1, wherein the one or more processors are configured to execute the instructions to use one or more subcarriers within the frequency band as a guard band to perform radio communications within the frequency band.

12. An User Equipment (UE) comprising:
a memory storing instructions; and
one or more processors configured to execute the instructions to:
receive guard band information, from a first base station, in a message related to establishing a Radio Resource Control (RRC) connection,
wherein, the guard band information comprises a value indicating a width of the guard band
wherein, the value is represented by plurality bits, and
wherein, if the value is 0, then the guard band information indicates absence of a guard band.

13. A method comprising:
transmitting guard band information, to a User Equipment (UE), in a message related to establishing a Radio Resource Control (RRC) connection,
wherein, the guard band information comprises a value indicating a width of the guard band
wherein, the value is represented by plurality bits, and
wherein, if the value is 0, then the guard band information indicates absence of a guard band.

14. The first base station according to claim 4, wherein the control information includes subcarrier spacing information indicating a subcarrier spacing of the radio resource.

15. The first base station according to claim 1, wherein the one or more processors are configured to execute the instructions to transmit the message to a UE which needs to be configured using the guard band, and to not transmit the message to another UE which does not need to be configured using the guard band.

16. The first base station according to claim 15, wherein the UE which needs to be configured using the guard band is allocated a radio resource including the guard band.

17. The UE according to claim 12, wherein a channel bandwidth is configured to include a first band with a first subcarrier spacing and a second band with a second subcarrier spacing, and
wherein the one or more processors are configured to execute the instructions to perform radio communications within the channel bandwidth using the guard band information.

18. The UE according to claim 17, wherein the one or more processors are configured to execute the instructions to receive a control information from the first base station and to communicate with a second base station using the control information.

19. A method comprising:
receiving guard band information, from a first base station, in a message related to establishing a Radio Resource Control (RRC) connection,
wherein, the guard band information comprises a value indicating a width of the guard band,
wherein, the value is represented by plurality bits, and
wherein, if the value is 0, then the guard band information indicates absence of a guard band.

* * * * *